United States Patent
Raghupathy et al.

(10) Patent No.: US 10,444,369 B2
(45) Date of Patent: Oct. 15, 2019

(54) SYSTEMS AND METHODS FOR GENERATING SIGNALS FROM TERRESTRIAL TRANSMITTERS, AND FOR PROCESSING THE SIGNALS USING GNSS RECEIVER HARDWARE

(71) Applicant: NextNav, LLC, Sunnyvale, CA (US)

(72) Inventors: Arun Raghupathy, Bangalore (IN); Chen Meng, Sunnyvale, CA (US); Norman F. Krasner, Redwood City, CA (US); Sameet Deshpande, Bangalore (IN)

(73) Assignee: NextNav, LLC, Sunnyvale, CA (US)

( * ) Notice: Subject to any disclaimer, the term of this patent is extended or adjusted under 35 U.S.C. 154(b) by 359 days.

(21) Appl. No.: 15/283,819

(22) Filed: Oct. 3, 2016

(65) Prior Publication Data

US 2017/0097421 A1    Apr. 6, 2017

Related U.S. Application Data

(60) Provisional application No. 62/237,317, filed on Oct. 5, 2015.

(51) Int. Cl.
  *G01S 19/11*    (2010.01)
  *H04J 13/00*    (2011.01)
  (Continued)

(52) U.S. Cl.
  CPC .............. *G01S 19/11* (2013.01); *G01S 19/25* (2013.01); *H04J 13/00* (2013.01); *H04J 13/14* (2013.01);
  (Continued)

(58) Field of Classification Search
  None
  See application file for complete search history.

(56) References Cited

U.S. PATENT DOCUMENTS 6,959,030 B1    10/2005  Clark
8,035,555 B2 *  10/2011  Winkel ................. H04B 1/707
                                              342/357.395
(Continued)

OTHER PUBLICATIONS

Form PCT/ISA/220, PCT/US2016/055134, "Notification of Transmittal of the International Search Report and the Written Opinion of the International Searching Authority, or the Declaration", 1 page(s); Form PCT/ISA/210, PCT/US2016/055134, "International Search Report ", 4 page(s); EPO Form PO4A42, 1 page(s); Form PCT/ISA/237, PCT/US2016/055134, "Written Opinion of the International Searching Authority", 9 page(s). dated Feb. 1, 2017.

(Continued)

*Primary Examiner* — Vladimir Magloire
*Assistant Examiner* — Donald HB Braswell
(74) *Attorney, Agent, or Firm* — Kyle Pendergrass

(57) ABSTRACT

Generating signals from non-GNSS transmitters, and processing the signals using a GNSS positioning module. Systems and methods identify a chipping rate, identify a PN code length, generate a PN code that has a length equal to the identified PN code length, generate a positioning signal using the identified chipping rate and the generated PN code, and transmit the positioning signal from the transmitter. The PN code length may produce, at the identified chipping rate, a PN code duration that is equal to or is a multiple of a PN code duration used in a GNSS system, the identified chipping rate may be equal to or a multiple of a chipping rate used in a GNSS system, and the identified PN code length may be equal to or a multiple of a PN code length used in a GNSS system.

20 Claims, 26 Drawing Sheets

(51) Int. Cl.
  *H04J 13/14* (2011.01)
  *G01S 19/25* (2010.01)
(52) U.S. Cl.
  CPC ....... *H04J 13/0022* (2013.01); *H04J 13/0029* (2013.01)

(56) References Cited

U.S. PATENT DOCUMENTS

| | | | | |
|---|---|---|---|---|
| 2010/0135365 A1* | 6/2010 | Chen | ................ | G01S 19/22 375/148 |
| 2012/0155349 A1* | 6/2012 | Bajic | ................ | H04W 4/80 370/311 |
| 2013/0057436 A1* | 3/2013 | Krasner | ................ | G01S 19/11 342/464 |
| 2013/0063301 A1* | 3/2013 | Pattabiraman | ................ | G01S 19/11 342/357.29 |
| 2013/0063307 A1* | 3/2013 | Krasner | ................ | G01S 19/05 342/387 |

OTHER PUBLICATIONS

Stewart Cobb H: "New spreading (PRN) codes for pseudolites", GPS Pseudolites: Theory, Design, and Applications, XX, XX, Dec. 1, 1997 (Dec. 1, 1997), pp. 73-77, XP002989241.

Soderholm Stefan et al: "Indoor Navigation Using a GPS Receiver", GPS 2001—Proceedings of the 14$^{th}$ InternationalTechnical Meeting of the Satellite Division of the Instiute of Navigation (ION GPS 2001), The Institute of Navigation, 8551 Rixlew Lane Suite 360 Manassas, VA 20109, USA, Sep. 14, 2001 (Sep. 14, 2001), pp. 1479-1486, XP056008977, p. 1480, section Pseudolite based positioning—p. 1483, section Receiver design.

Form PCT/ISA/237, PCT/US2016/055134, "Written Opinion of the International Searching Authority", 7 page(s), dated Feb. 1, 2017, *claims under review are included for reference, 4 page(s) * references listed in Written Opinion are already of record.

Applicant, Response to Search Report, European patent application No. 16788280.2, 21 page(s), dated Oct. 10, 2018.

\* cited by examiner

| GNSS Codes | Code Duration | PN Length | Chipping Rate |
|---|---|---|---|
| GPS L1 C/A PN codes | 1 ms | 1023 | 1.023 Mcps |
| Beidou L1 PN codes | 1 ms | 2046 | 2.046 Mcps |
| Glonass L1 PN codes | 1 ms | 511 | 511 bps |
| Galileo E1B PN codes | 4 ms | 4092 | 1.023 Mcps |

| Interleaved Code Pair Number | Gold Code 1 (PN$_b$ Delay) | Gold Code 2 (PN$_b$ Delay) | Inserted Additional Delay for Gold Code 2 to Yield Best Zonal Width | Total Cross Correlation Run | Interleaved Zonal Length (+/-) |
|---|---|---|---|---|---|
| 1 | 853 | 818 | 711 | 30 | 27 |
| 2 | 714 | 456 | 342 | 37 | 36 |
| 3 | 797 | 298 | 494 | 27 | 26 |
| 4 | 602 | 476 | 401 | 24 | 24 |
| 5 | 1012 | 465 | 852 | 31 | 25 |
| 6 | 536 | 22 | 361 | 33 | 25 |
| 7 | 422 | 37 | 701 | 27 | 26 |
| 8 | 76 | 960 | 798 | 29 | 28 |
| 9 | 373 | 79 | 16 | 29 | 28 |
| 10 | 135 | 740 | 612 | 26 | 26 |
| 11 | 52 | 83 | 529 | 36 | 27 |
| 12 | 16 | 462 | 740 | 28 | 28 |
| 13 | 15 | 816 | 393 | 36 | 25 |
| 14 | 953 | 837 | 210 | 33 | 25 |
| 15 | 530 | 712 | 700 | 25 | 24 |
| 16 | 580 | 484 | 36 | 31 | 25 |

FIG. 10

| Code Pair Number | Gold Code1 | | Gold Code 2 | | Composite Zonal Length (+/-) |
|---|---|---|---|---|---|
| | PN$_{1a}$ Fill | PN$_{1b}$ Fill | PN$_{2a}$ Fill | PN$_{2b}$ Fill | |
| 1 | 1111111111 | 1000100001 | 0010111010 | 1001100110 | 27 |
| 2 | 1111111111 | 0011111100 | 1110110100 | 1001100010 | 36 |
| 3 | 1111111111 | 0011000101 | 0101100101 | 0010101110 | 26 |
| 4 | 1111111111 | 1110110011 | 1010000001 | 0100101101 | 24 |
| 5 | 1111111111 | 0101101001 | 1101001110 | 1101111101 | 25 |
| 6 | 1111111111 | 0111100110 | 1100110101 | 0101000010 | 25 |
| 7 | 1111111111 | 0010110011 | 0110001011 | 1001100000 | 26 |
| 8 | 1111111111 | 0011111110 | 1100111011 | 1100000010 | 28 |
| 9 | 1111111111 | 0110110011 | 1100001110 | 0101111100 | 28 |
| 10 | 1111111111 | 1001101110 | 1111001110 | 0001000001 | 26 |
| 11 | 1111111111 | 0010110111 | 1011110110 | 1001000111 | 27 |
| 12 | 1111111111 | 1101001000 | 0101001011 | 1100101010 | 28 |
| 13 | 1111111111 | 1010010000 | 0110010010 | 1000101110 | 25 |
| 14 | 1111111111 | 0010000110 | 1001111000 | 1110010011 | 25 |
| 15 | 1111111111 | 0110100001 | 1100010110 | 1100100101 | 24 |
| 16 | 1111111111 | 0110011010 | 0111110010 | 1101000000 | 25 |

FIG. 12

| Code Pair Number | Gold Code 1 (PN$_b$ Delay) | Gold Code 2 (PN$_b$ Delay) | Inserted Additional Delay for Gold Code 2 to Yield Best Zonal Width | Total Cross-Correlation Run | Composite Zonal Length (+/-) |
|---|---|---|---|---|---|
| 17 | 29 | 157 | 254 | 34 | 23 |
| 18 | 482 | 289 | 456 | 25 | 23 |
| 19 | 1018 | 870 | 280 | 30 | 21 |
| 20 | 926 | 365 | 438 | 31 | 21 |
| 21 | 780 | 657 | 420 | 32 | 21 |
| 22 | 595 | 567 | 746 | 28 | 21 |
| 23 | 540 | 586 | 161 | 24 | 21 |
| 24 | 358 | 883 | 635 | 28 | 21 |
| 25 | 238 | 333 | 678 | 36 | 21 |
| 26 | 225 | 56 | 443 | 28 | 28 |
| 27 | 145 | 34 | 706 | 28 | 21 |
| 28 | 72 | 836 | 157 | 30 | 21 |
| 29 | 48 | 851 | 507 | 21 | 20 |
| 30 | 894 | 849 | 219 | 23 | 22 |
| 31 | 879 | 815 | 352 | 29 | 21 |
| 32 | 771 | 607 | 155 | 22 | 21 |

FIG. 16

| Code Pair Number | Gold Code 1 | | Gold Code 2 | | Composite Zonal Length (+/-) |
|---|---|---|---|---|---|
| | PN$_{1a}$ Fill | PN$_{1b}$ Fill | PN$_{2a}$ Fill | PN$_{2b}$ Fill | |
| 17 | 1111111111 | 1001111100 | 0111110001 | 0011100010 | 23 |
| 18 | 1111111111 | 0110001000 | 0000110101 | 0110010100 | 23 |
| 19 | 1111111111 | 1111100101 | 1001100100 | 1000110000 | 21 |
| 20 | 1111111111 | 1011010011 | 0010101111 | 0010010011 | 21 |
| 21 | 1111111111 | 1001110000 | 1100110111 | 1000101101 | 21 |
| 22 | 1111111111 | 0111100000 | 1000100101 | 1111010000 | 21 |
| 23 | 1111111111 | 0111011110 | 1100000110 | 0001100101 | 21 |
| 24 | 1111111111 | 0100011100 | 1110010110 | 0010010000 | 21 |
| 25 | 1111111111 | 1111000111 | 0101111101 | 1011010010 | 21 |
| 26 | 1111111111 | 0001000011 | 1101000101 | 1100001001 | 28 |
| 27 | 1111111111 | 1001000110 | 1101001100 | 1010011000 | 21 |
| 28 | 1111111111 | 1111100000 | 0001100000 | 0100000111 | 21 |
| 29 | 1111111111 | 1101110011 | 0000111001 | 1010000001 | 20 |
| 30 | 1111111111 | 0101111011 | 1101101111 | 1110011011 | 22 |
| 31 | 1111111111 | 1001001011 | 1011000010 | 0010001101 | 21 |
| 32 | 1111111111 | 0000100101 | 0110000000 | 1010101000 | 21 |

FIG. 17

| Interleaved Code # | Code Sets | Delay of Second Set | Zonal Region Length (Chips) |
|---|---|---|---|
| 1 | 1,2 | 257 | 83 |
| 2 | 3,4 | 277 | 75 |
| 3 | 5,6 | 2 | 51 |
| 4 | 7,8 | 1 | 59 |
| 5 | 9,10 | 549 | 63 |
| 6 | 11,12 | 125 | 67 |
| 7 | 13,14 | 1 | 55 |
| 8 | 15,16 | 5 | 59 |
| 9 | 17,18 | 16 | 47 |
| 10 | 19,20 | 265 | 67 |
| 11 | 21,22 | 32 | 43 |
| 12 | 23,24 | 5 | 47 |
| 13 | 25,26 | 65 | 67 |
| 14 | 27,28 | 2 | 47 |
| 15 | 29,30 | 352 | 66 |
| 16 | 31,32 | 137 | 67 |

FIG. 18

| Interleaved Code # | Gold Code1 | | Gold Code2 | | Gold Code3 | | Gold Code4 | | Zonal Region Length (Chips) |
| | $PN_{1a}$ | $PN_{1b}$ | $PN_{2a}$ | $PN_{2b}$ | $PN_{3a}$ | $PN_{3b}$ | $PN_{4a}$ | $PN_{4b}$ | |
|---|---|---|---|---|---|---|---|---|---|
| 1 | 0 | 853 | 711 | 1529 | 257 | 971 | 599 | 1055 | 83 |
| 2 | 0 | 797 | 494 | 792 | 277 | 879 | 678 | 1154 | 75 |
| 3 | 0 | 1012 | 852 | 1317 | 2 | 538 | 363 | 385 | 51 |
| 4 | 0 | 422 | 701 | 738 | 1 | 77 | 799 | 1759 | 59 |
| 5 | 0 | 373 | 16 | 95 | 549 | 684 | 1161 | 1901 | 63 |
| 6 | 0 | 52 | 529 | 612 | 125 | 141 | 865 | 1327 | 67 |
| 7 | 0 | 15 | 393 | 1209 | 1 | 954 | 211 | 1048 | 55 |
| 8 | 0 | 530 | 700 | 1412 | 5 | 585 | 41 | 525 | 59 |
| 9 | 0 | 29 | 254 | 411 | 16 | 498 | 472 | 761 | 47 |
| 10 | 0 | 1018 | 280 | 1150 | 265 | 1191 | 703 | 1068 | 67 |
| 11 | 0 | 780 | 420 | 1077 | 32 | 627 | 778 | 1345 | 43 |
| 12 | 0 | 540 | 161 | 747 | 5 | 363 | 640 | 1523 | 47 |
| 13 | 0 | 238 | 678 | 1011 | 65 | 290 | 508 | 564 | 67 |
| 14 | 0 | 145 | 706 | 740 | 2 | 74 | 159 | 995 | 47 |
| 15 | 0 | 48 | 507 | 1358 | 352 | 1246 | 571 | 1420 | 66 |
| 16 | 0 | 879 | 352 | 1167 | 137 | 908 | 292 | 899 | 67 |

FIG. 19

| Interleaved Code # | Gold Code 1 | | Gold Code 2 | | Gold Code 3 | | Gold Code 4 | | Zonal Length |
|---|---|---|---|---|---|---|---|---|---|
| | PN$_{1a}$ | PN$_{1b}$ | PN$_{2a}$ | PN$_{2b}$ | PN$_{3a}$ | PN$_{3b}$ | PN$_{4a}$ | PN$_{4b}$ | |
| 1 | 11111111 | 10000001 | 00101010 | 10011000 | 11101110 | 10000010 | 10100101 | 01001111 | 83 |
| 2 | 11111111 | 00110101 | 01011010 | 00101110 | 11001000 | 10010011 | 01011111 | 10111011 | 75 |
| 3 | 11111111 | 01011001 | 11011110 | 11011111 | 01111111 | 11011111 | 11111011 | 10010000 | 51 |
| 4 | 11111111 | 00101011 | 01110011 | 10011100 | 01111111 | 10011111 | 01110101 | 01100001 | 59 |
| 5 | 11111111 | 01101011 | 11011110 | 01011100 | 00011111 | 11111101 | 10111101 | 00010110 | 63 |
| 6 | 11111111 | 00110111 | 10111110 | 10010111 | 11000010 | 00110001 | 01101100 | 10010110 | 67 |
| 7 | 11111111 | 10100000 | 01101010 | 10010110 | 01111111 | 10010011 | 11110100 | 11110001 | 55 |
| 8 | 11111111 | 01101001 | 11001110 | 11001101 | 00001111 | 11000011 | 01110011 | 00011111 | 59 |
| 9 | 11111111 | 10011100 | 01111001 | 00111100 | 11000110 | 10000010 | 00010100 | 01010001 | 47 |
| 10 | 11111111 | 11111101 | 10011001 | 10001100 | 01001010 | 00111011 | 10011010 | 11100111 | 67 |
| 11 | 11111111 | 10011000 | 11001110 | 10010111 | 11000001 | 01011000 | 01011110 | 00010011 | 43 |
| 12 | 11111111 | 01110110 | 11001110 | 00011010 | 00001111 | 01111010 | 00110100 | 01101001 | 47 |
| 13 | 11111111 | 11110111 | 01011110 | 10110010 | 01001011 | 11110010 | 00001000 | 10111110 | 67 |
| 14 | 11111111 | 10011010 | 11001100 | 10100110 | 00111111 | 11111110 | 00000100 | 01010001 | 47 |
| 15 | 11111111 | 11011011 | 00001110 | 10100001 | 10110001 | 01000011 | 11111011 | 10110011 | 66 |
| 16 | 11111111 | 10011011 | 10110010 | 00100110 | 10101110 | 00111110 | 01110010 | 00010001 | 67 |

FIG. 21

| | Code Taps (R11) | Zonal Region Length (Chips) for Autocorrelation <=6/2046 | PN Chip Deleted (Initial Fill is all 1's) |
|---|---|---|---|
| 1 | [11 10 9 8 7 4] | 50 | 1512 |
| 2 | [11 10 8 7 6 4 3 1] | 48 | 791 |
| 3 | [11 10 9 7 6 5 4 1] | 48 | 140 |
| 4 | [11 9 8 7 6 5 3 2] | 46 | 32 |
| 5 | [11 8 6 3] | 46 | 202 |
| 6 | [11 9 8 6 5 2] | 45 | 215 |
| 7 | [11 10 9 8 7 5 3 2] | 44 | 406 |
| 8 | [11 9 7 2] | 44 | 397 |
| 9 | [11 10 6 5] | 44 | 1156 |
| 10 | [11 10 8 5 3 2] | 43 | 1558 |
| 11 | [11 10 8 7 6 3] | 43 | 1115 |
| 12 | [11 10 9 5 3 1] | 43 | 1589 |
| 13 | [11 10 9 7 5 1] | 43 | 1492 |
| 14 | [11 10 9 2] | 43 | 194 |
| 15 | [11 9 8 7 6 4 3 2] | 42 | 310 |
| 16 | [11 10 9 8 7 6 3 2] | 42 | 1326 |
| 17 | [11 10 9 8 7 6 4 1] | 42 | 469 |
| 18 | [11 10 7 6 3 2] | 42 | 635 |
| 19 | [11 10 8 7 4 1] | 42 | 530 |
| 20 | [11 9 8 4] | 42 | 1149 |
| 21 | [11 10 7 2] | 42 | 1094 |
| 22 | [11 10 8 7 6 5] | 41 | 2020 |
| 23 | [11 7 6 5] | 41 | 1380 |
| 24 | [11 10 8 1] | 41 | 162 |

SYSTEMS AND METHODS FOR GENERATING SIGNALS FROM TERRESTRIAL TRANSMITTERS, AND FOR PROCESSING THE SIGNALS USING GNSS RECEIVER HARDWARE

TECHNICAL FIELD

This disclosure relates to generating signals from non-GNSS transmitters, and to processing the signals using a GNSS positioning module.

BACKGROUND

Positioning systems are used to estimate the position of a user device ("receiver") within an environment. Such positioning systems include GNSS positioning systems (e.g. GPS) and non-GNSS positioning systems (e.g. terrestrial positioning systems). GNSS positioning systems and non-GNSS positioning systems transmit positioning signals that are received by a receiver. The received positioning signals are used to generate an estimated position of the receiver (e.g. by estimating the range of travel for each signal, and using those ranges in a trilateration algorithm).

Positioning signals transmitted from non-GNSS transmitters may be generated using PN codes that are selected to allow a receiver to resolve the multipath effects of the positioning signals. The PN codes may be selected to have desirable autocorrelation and cross-correlation properties. Furthermore, chip rates of such positioning signals may be selected such that the bandwidth of the positioning signals is scaled for multipath resolvability. In some instances, an estimated position generated using positioning signals from a non-GNSS positioning system may be more accurate than an estimated position generated exclusively using positioning signals from a GNSS positioning system.

Existing GNSS receiver hardware, while ubiquitous, is not intended for use in determining a position estimate of a receiver using a non-GNSS positioning signal if the code duration and chipping rate of the non-GNSS positioning signal does not relate to that of a GNSS code duration and chipping rate. Unfortunately, adding a non-GNSS positioning module to consumer devices may be impractical or expensive. For this, and for other reasons, it is therefore desirable to process both GNSS positioning signals and non-GNSS positioning signals using the same positioning module hardware (e.g. a GNSS receiver hardware) to allow existing user devices to utilize signaling from non-GNSS positioning systems. Different systems and methods for generating signals from non-GNSS transmitters, and for processing the signals using a GNSS positioning module are described in the disclosure that follows.

BRIEF DESCRIPTION OF THE DRAWINGS

FIG. 10 illustrates a table showing example sets of PN code generation delay parameters for generating two PN codes.

FIG. 12 illustrates a table showing example sets of PN code generation fill parameters for generating two PN codes.

FIG. 16 illustrates a table showing additional example sets of PN code generation delay parameters for generating two PN codes.

FIG. 17 illustrates a table showing additional example sets of PN code generation fill parameters for generating two PN codes.

FIG. 18 depicts a table of example zonal regions resulting from interleaving four PN codes using delays.

FIG. 19 depicts a table of example PN code generation delay parameters for generating four PN codes.

FIG. 21 depicts a table of example PN code generation fill parameters for generating four PN codes.

FIG. 26 depicts a table of truncated maximal length codes.

DETAILED DESCRIPTION

Figure 1:
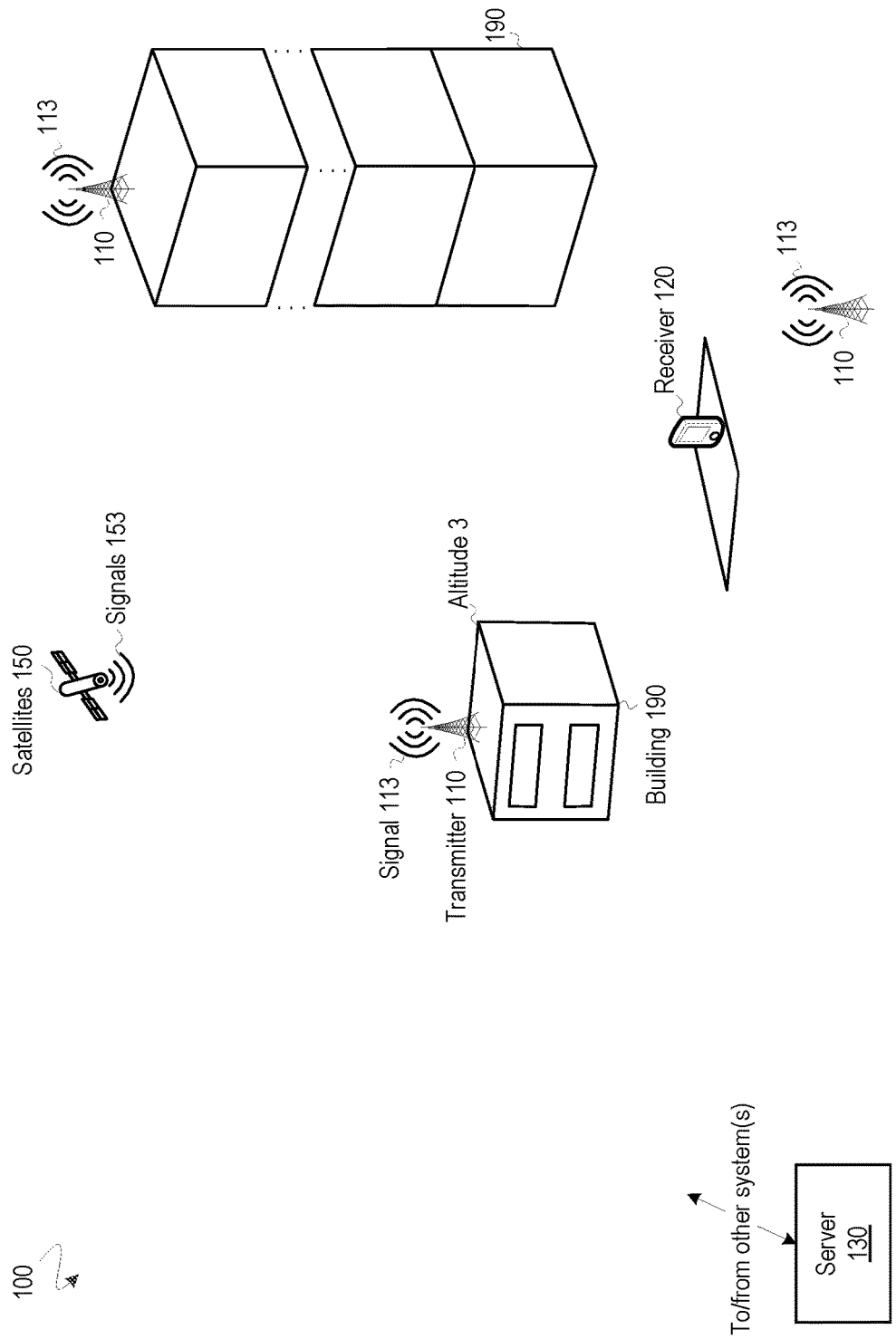
FIG. 1 illustrates an operational environment for generating signals from non-GNSS transmitters, and for processing the signals using a GNSS positioning module.

Systems and methods for generating signals from non-GNSS transmitters, and for processing the signals using a GNSS positioning module are described below. Attention is initially drawn to an operational environment for generating signals from non-GNSS transmitters, and for processing the signals using a GNSS positioning module illustrated in FIG. 1. The operational environment includes a positioning system 100 with a network of non-GNSS terrestrial transmitters 110 and at least one receiver 120. Each of the transmitters 110 and the receiver 120 may be located at different altitudes or depths that are inside or outside various natural or manmade structures (e.g. buildings) 190. Positioning signals 113 and 153 are sent to the receiver 120 from the transmitters 110 and satellites 150, respectively, using known wireless or wired transmission technologies. The transmitters 110 may transmit the signals 113 using one or more common multiplexing parameters—e.g. time slot, pseudorandom sequence, frequency offset, or other.

Figures 2, 3:
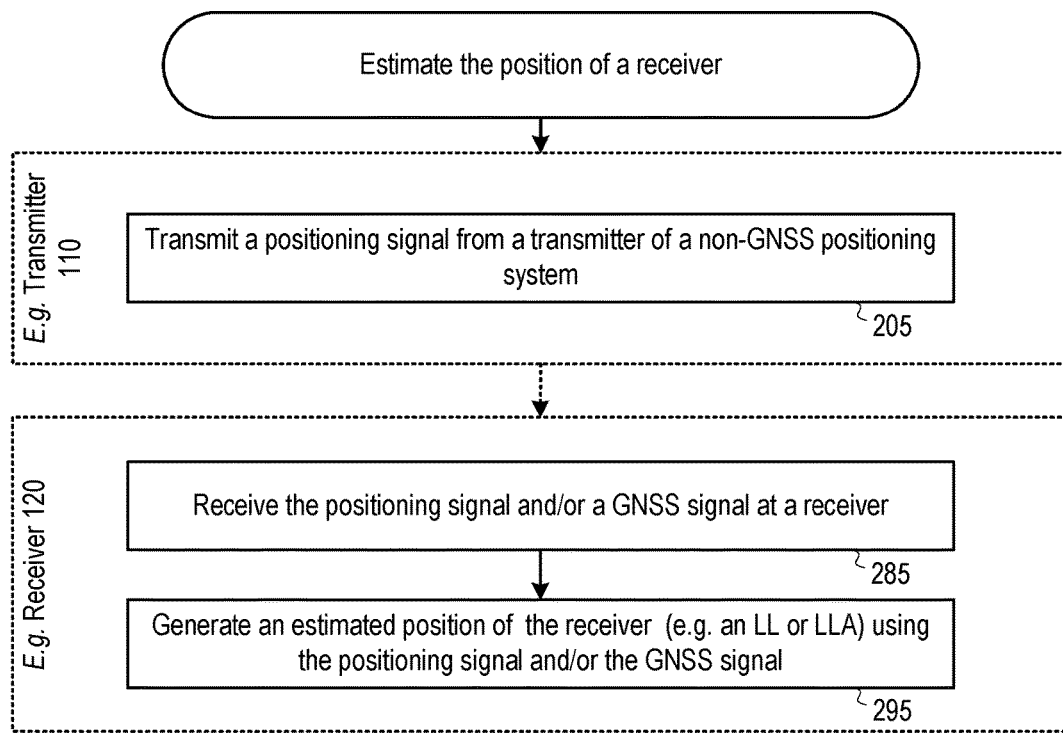
FIG. 2 provides a process for estimating the position of a receiver.
FIG. 3 depicts a table of example GNSS code durations, lengths and chipping rates.

A process for estimating the position of a receiver 120 is provided in FIG. 2. As shown, the positioning signals 113 are transmitted from the non-GNSS transmitters 110 at step 205. The signals 113 and/or a GNSS signal 153 are received at a receiver at step 285, and an estimated position of the receiver (e.g. latitude, longitude and/or altitude) is generated using the signals 113 and/or the GNSS signal 153 at step 295. The signals 113 transmitted from the transmitters 110 at step 205 are generated using a PN code and a chipping rate selected to allow a receiver 120 to clearly resolve the multipath effects of the positioning signal. The PN codes may be selected to have desirable autocorrelation and cross-correlation properties. Chip rates of such positioning signals may be selected such that the bandwidth of the positioning signals is scaled for multipath resolvability.

In conventional spread spectrum systems, the bandwidth (e.g. null-to-null bandwidth) of a signal transmitted by the spread spectrum system is tied to the chipping rate of the signal. In communication systems where bandwidth efficiency is a concern, the RF bandwidth is usually chosen between R and 2R where the R is the chipping rate. Bandwidth efficiency is of lesser importance in a positioning system. Instead, resolvability of a particular signal is of greater concern. Resolvability achievable with a particular signal is a function of its RF bandwidth. For instance, in an exemplary non-GNSS positioning system a chipping rate of 2.5×1.023 Mcps was chosen to be used along with a standard pulse shaping filter to generate a positioning signal that occupies ~2.5×2×1.023=5.115 MHz of RF bandwidth. With this chipping rate, a code length of 2047 with a low autocorrelation property may be used for multipath performance.

For reference, a table of example GNSS signal code durations, code lengths and chipping rates is depicted in FIG. 3. An example non-GNSS positioning signal has a code length of 2047 and a chipping rate of 1.023 Mcps. This combination of code length and chipping rate is not included among the GNSS code lengths or durations shown in FIG. 3. Consequently, at step 285 of FIG. 2, a receiver 120 having only a GNSS positioning module may not be able to generate an estimated position of the receiver using such a non-GNSS positioning signal. Thus, there is a need to create a non-GNSS PN code and chipping rate combination (e.g. a code of 1 ms duration that occupies 5 MHz of RF bandwidth) that conforms to expected GNSS combinations so existing GNSS receiver hardware can be used while retaining acceptable multipath performance.

Figure 4:
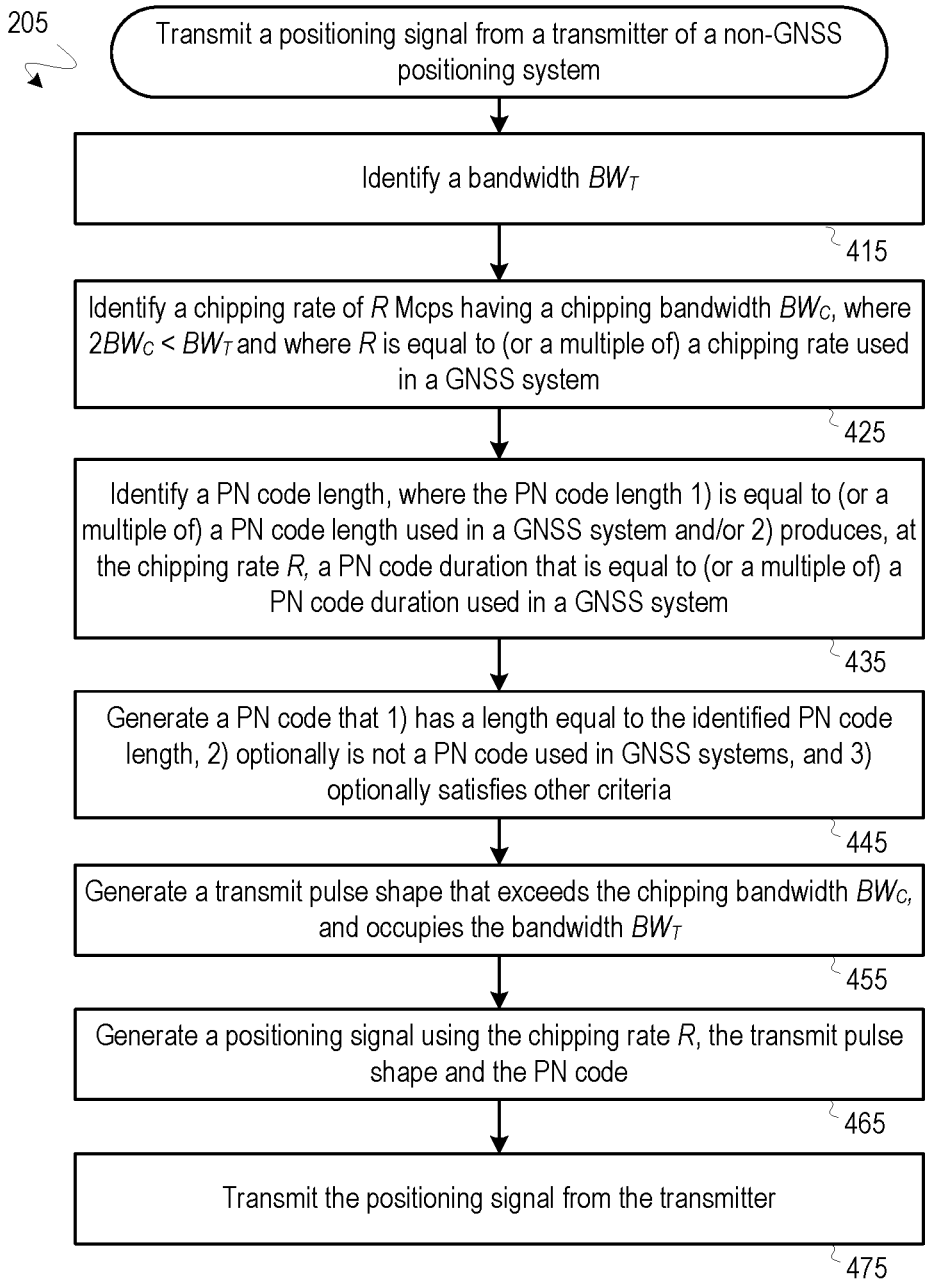
FIG. 4 provides a process for transmitting, from a transmitter of a non-GNSS positioning system, a positioning signal that is compatible with a GNSS positioning module.

Generating Signals from Non-GNSS Transmitters, and Processing the Signals Using a GNSS Positioning Module A process for transmitting a non-GNSS positioning signal (e.g. one of the signals 113) from a non-GNSS transmitter (e.g. one of the transmitters 110), where the signal is compatible with a GNSS positioning module of a receiver 120, is provided in FIG. 4. As shown, a bandwidth $BW_T$ is identified at step 415. In some implementations, the bandwidth $BW_T$ is selected to achieve multipath resolvability of transmitted positioning signals. A chipping rate of R Mcps having a bandwidth $BW_C$, where $2BW_C<BW_T$ and where R is equal to (or is a multiple of) a chipping rate used in a GNSS system is identified at step 425. In a different embodiment, $2BW_C>BW_T$. At step 435, a PN code length is identified, where the PN code length 1) is equal to (or is a multiple of) a PN code length used in a GNSS system and/or 2) produces, at the chipping rate R, a PN code duration that is equal to (or a multiple of) a PN code duration used in a GNSS system. The above multiples for steps 425 and 435 can be the same integer or fraction. At step 445, a PN code is generated that 1) has a length equal to the identified PN code length, 2) optionally is not a PN code used in GNSS systems (e.g. not of GPS, GLONASS, Galileo and Beidou), and 3) optionally satisfies other criteria (e.g. auto-correlation and/or cross-correlation criteria discussed below). A transmit pulse shape having a bandwidth that exceeds the bandwidth $BW_T$ of the chipping rate R, and occupies (e.g. is equal to) the bandwidth $BW_T$ is generated at step 455. Details of generating the transmit pulse shape filter is discussed with reference to FIG. 7. A positioning signal using the chipping rate R, the transmit pulse shape, and the PN code is generated at step 465, and the positioning signal is transmitted from the transmitter at step 475.

In one implementation, the other criteria of step 445 includes criteria that the generated PN code has an autocorrelation peak to side lobe ratio greater than 50 dB in a first region, and has an autocorrelation peak to side lobe ratio greater than 40 dB in a second region, where the first region includes a region that is one or both of at least +/−2500 m from the main lobe or at least +/−20 chips centered at zero lag, and where the second region is wider than the first region.

In one embodiment, the GNSS system that uses the chipping rate identified at step 425 is the same GNSS system as the GNSS system that uses the PN code length identified at step 435. In one another embodiment, the GNSS system that uses the chipping rate identified at step 425 is a different GNSS system than the GNSS system that uses the PN code length identified at step 435.

The bandwidth $BW_T$ identified at step 415 conforms to a bandwidth of GNSS to allow for easier re-use of existing GNSS positioning modules. In one embodiment, the bandwidth $BW_T$ is 5 MHz. The chipping rate of R Mcps identified at step 425 is optionally selected from among existing GNSS chipping rates to achieve the bandwidth $BW_T$. With reference to the table of FIG. 3, a chipping rate of R=2.046 Mcps of the Beidou system permits use of a 2046 length PN code and produces a 1 ms code duration. It may be preferable to use the closest target chipping rate from GNSS to minimize inter-chip interference. Consuming extra bandwidth may cause an increase in inter-chip interference (ICI), but an increase in ICI is typically not a factor for positioning systems. Of course, other PN code lengths, chipping rates and pulse shape combinations are possible.

Figure 5:
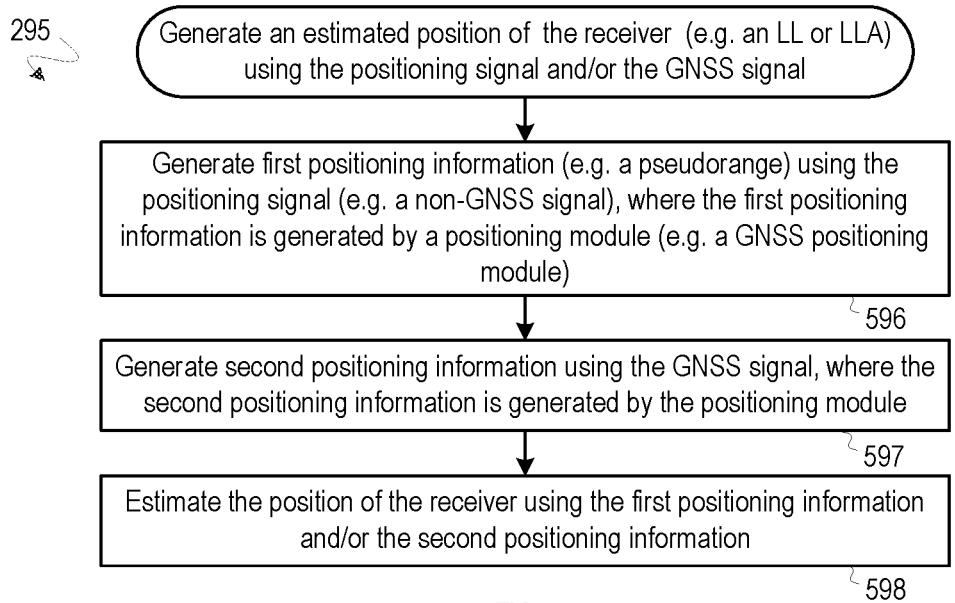
FIG. 5 provides a process for using a positioning signal and/or a GNSS signal to estimate the position of a receiver.

The positioning signal transmitted at step 475 can be used by a GNSS positioning module (e.g. GNSS hardware) of a receiver to generate an estimated position of the receiver (e.g. by estimating the range of travel for the signal, and using the range in a trilateration algorithm). By way of example, a process for using a non-GNSS positioning signal (e.g. one of the signals 113) and/or a GNSS signal (e.g. one of the signals 153) to estimate the position of a receiver (e.g. the receiver 120) is provided in FIG. 5. As shown, first positioning information (e.g. a pseudorange) is generated using the non-GNSS positioning signal, where the first positioning information is generated by a positioning module (e.g. a GNSS positioning module) at step 596. Then, second positioning information (e.g. a pseudorange) is generated by the positioning module using the GNSS signal at step 597. The position of the receiver is then estimated using the first positioning information and/or the second positioning information at step 598.

In one embodiment, the position of the receiver is estimated using high resolution signal processing methods to avoid mistaking side-lobes as multipath. High-resolution methods are a class of efficient multipath-resolution methods which use Eigen-space decompositions to locate the multipath components. Methods such as MUSIC, ESPIRIT fall under this class of resolution schemes that can better resolve closely-spaced multipath components than traditional methods for a given bandwidth. High resolution earliest time-of-arrival (TOA) methods attempt to estimate directly the TOA of an earliest path rather than inferring the peak position from the peak values. A partitioned matched filter with chip matched filter and code matched filter may be used by a receiver so GNSS acquisition and tracking hardware can be used for non-GNSS signals. The re-use of GNSS acquisition hardware on non-GNSS signals allows for the independent acquisition of each non-GNSS signal without additional/custom hardware.

Figure 6:
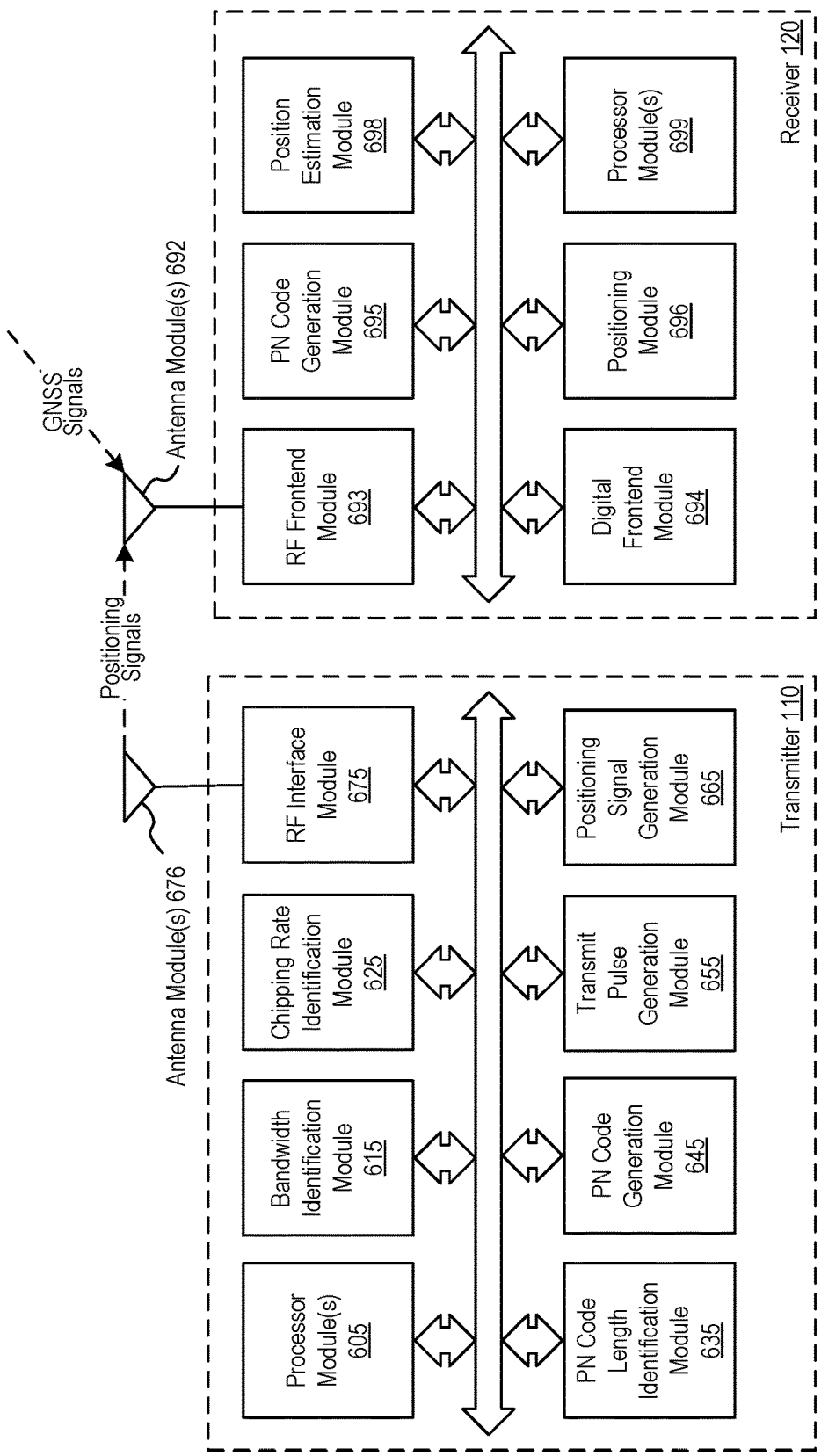
FIG. 6 depicts one embodiment of a system for generating signals from non-GNSS transmitters, and for processing the signals using a GNSS positioning module.

Systems for Generating Signals from Non-GNSS Transmitters, and for Processing the Signals Using a GNSS Positioning Module One embodiment of a system for generating signals from non-GNSS transmitters, and for processing the signals using a GNSS positioning module is depicted in FIG. 6. As shown, a transmitter 110 includes various modules that are each operable to carry out different steps of FIG. 4. A receiver 120 is also shown to include various modules that are each operable to carry out different steps of FIG. 5.

As shown in FIG. 6, modules of the transmitter 110 may include: processor module(s) 605; a bandwidth identification module 615 operable to perform step 415; a chipping rate identification module 625 operable to perform step 425; a PN code length identification module 635 operable to perform step 435; a PN code generation module 645 operable to carry out step 445; a transmit pulse generation module 655 operable to perform step 455; a positioning signal generation module 665 operable to carry out step 465; and an RF interface module 675 and antenna module(s) 676 collectively operable to carry out step 475. The processor module(s) 605, the bandwidth identification module 615, the chipping rate identification module 625, the PN code length identification module 635, the PN code generation module 645 and the transmit pulse generation module 655 are coupled to the positioning signal generation module 665. The positioning signal generation module 665 is coupled to the RF interface module 675, and the RF interface module 675 is coupled to the antenna module(s) 676.

As shown in FIG. 6, modules of the receiver 120 may include: antenna module(s) 692; an RF frontend module 693; a digital frontend module 694; a PN code generation module 695; a positioning module 696 operable to perform step 596 and step 597; a position estimation module 698 operable to perform step 598; and processor modules(s) 699. The antenna module(s) 692 are coupled to the RF frontend module 693. The RF frontend module 693, the digital frontend module 694 and the PN code generation module 695 are coupled to the positioning module 696. The positioning module 696 is coupled to the position estimation module 698, and the position estimation module 698 is coupled to the processor modules(s) 699. In certain embodiments, the antenna module(s) 692 are coupled to the positioning module 696, and the positioning module 696 includes GNSS receiver hardware that is operable to determine an estimated position using GNSS positioning signals.

Generating a Transmit Pulse Shape Filter

Figure 7:
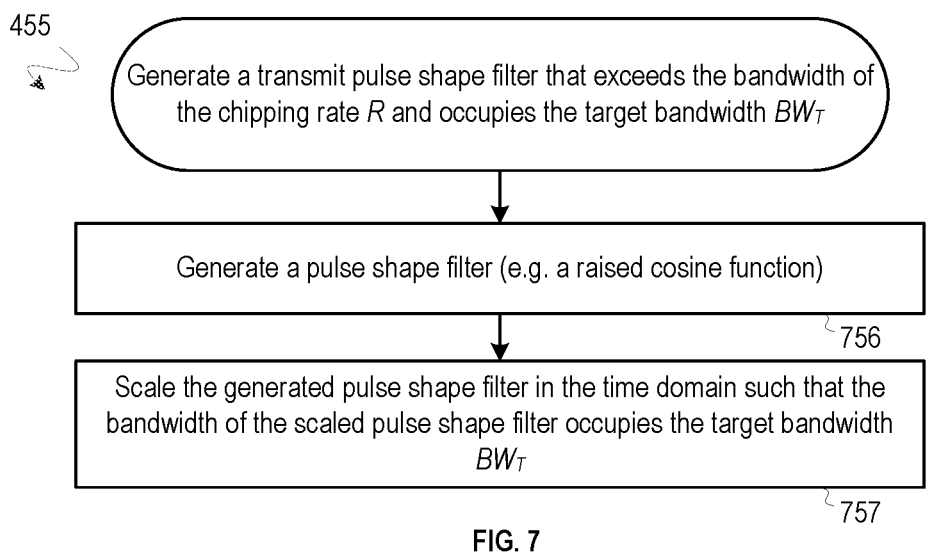
FIG. 7 provides a process for generating a transmit pulse shape filter that exceeds the bandwidth of a chipping rate and occupies a target transmission bandwidth.

A process for generating a transmit pulse shape filter that exceeds the bandwidth of a chipping rate and occupies a target transmission bandwidth (e.g. $BW_T$) is provided in FIG. 7. A pulse shape filter is generated (e.g. a raised cosine function) at step 756. Then, the generated pulse shape filter is scaled in the time domain such that the bandwidth of the scaled pulse shape filter occupies the bandwidth $BW_T$ at step 757. Step 756 and step 757 may occur as part of the same step. The pulse shape filter can be generated using a raised cosine filter scaled in time. Below is example Matlab code for such a raised cosine, $$\text{filt} = r\cos \text{flt}([\text{zeros}(1,9),\ 1,\ \text{zeros}(1,9)],\ 1,\ 32,\ \text{'sqrt'},\\ 1,\ 9);\ [\sim,\ \text{idx}] = \max(\text{filt});\ \text{filt\_down} = \text{filt}(\text{idx} - 9*5*5\text{:}5\text{:}\text{idx} + 9*5*5); \quad \text{(Equation 1)}$$

Figure 8:
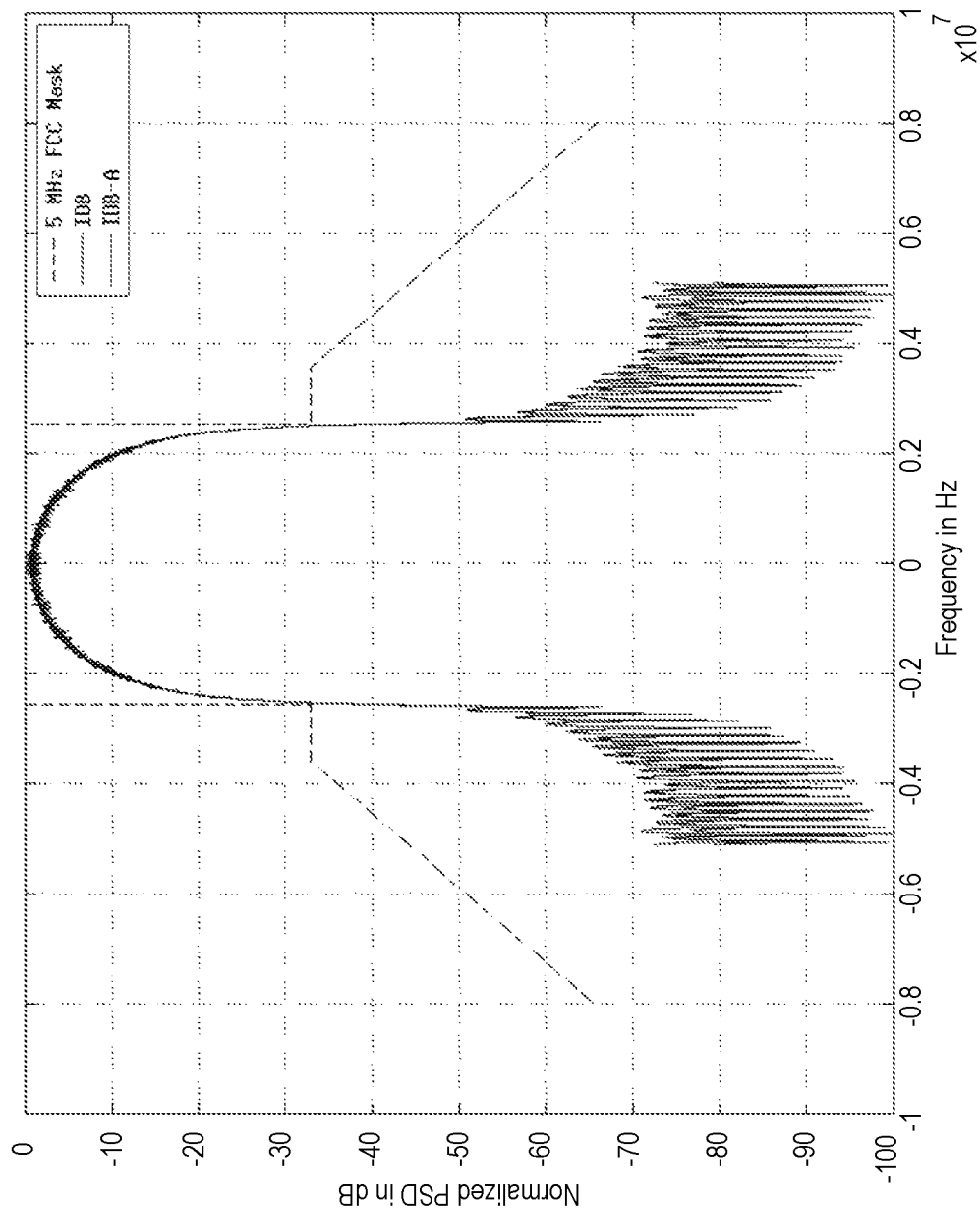
FIG. 8 depicts a pulse shape filter that exceeds the bandwidth of a chipping rate and occupies a target transmission bandwidth.

The resulting pulse shape filter that exceeds the bandwidth of a chipping rate and occupies a bandwidth $BW_T$ is depicted in FIG. 8. The filter response in dB is shown in IDB and IDB-A. IDB depicts an example where the chip rate=BW/2 (e.g. 2.5575 Mcps chipping rate for 5.115 MHz BW). IDB-A depicts an example where the chip rate<BW/2 (e.g. 2.046 Mcps chipping rate for 5.115 MHz RF BW). Using this approach, a positioning signal of a lower chipping rate can achieve similar multipath resolvability as a positioning signal having a higher chipping rate. For example, by using a pulse shape that consumes 5 MHz of bandwidth, a positioning signal using a chipping rate of 2.046 Mcps can achieve the same resolvability as a positioning signal which uses a chipping rate of 2.5575 Mcps.

Generating a PN Code that Relates to an Existing GNSS Code Duration

Various ways of generating a PN code are discussed below. One way to generate a PN code is to interleave two or more shorter PN codes (e.g. Gold codes) using delay modules or using initial PN generator fill values to generate a longer interleaved PN code. Another way to generate such a PN code is to truncate a maximal length code (m-sequence) to attain the desired PN code length. Systems and methods for generating PN codes using the above approaches are described below.

Generating a PN Code Using Interleaving

In one embodiment, two or more PN codes are interleaved to generate an interleaved PN code that is suitable for a positioning system in terms of autocorrelation properties with a desired code duration (e.g. 1 ms) for a particular chipping rate R. For example, two or more 1023 length Gold codes that have a good zonal region adjacent to the autocorrelation peak are generated, in which the side lobe magnitudes are at most $1/1023$ times the peak. The two or more generated PN codes are then interleaved to generate an interleaved PN code with a length that is a multiple of the base 1023 length and which also has good zonal region rejection. Two 1023 length PN codes, when interleaved, will generate a length 2046 PN code. As was shown in FIG. 3, a length 2046 PN code at a chipping rate of 2.046 Mcps has the code length and the duration of Beidou L1 PN codes. The "good" zonal region (for autocorrelation/cross-correlation) is determined by the multipath environment. The spread of multipath will determine the zonal region to fit in the significant portion (enough amplitude) multipath profile so that we can detect the earliest arriving path for location. For example, a 1 km multipath profile would require a 3 us zonal region. That translates to different requirement of zonal region expressed in chips for different chipping rates.

Figure 9:
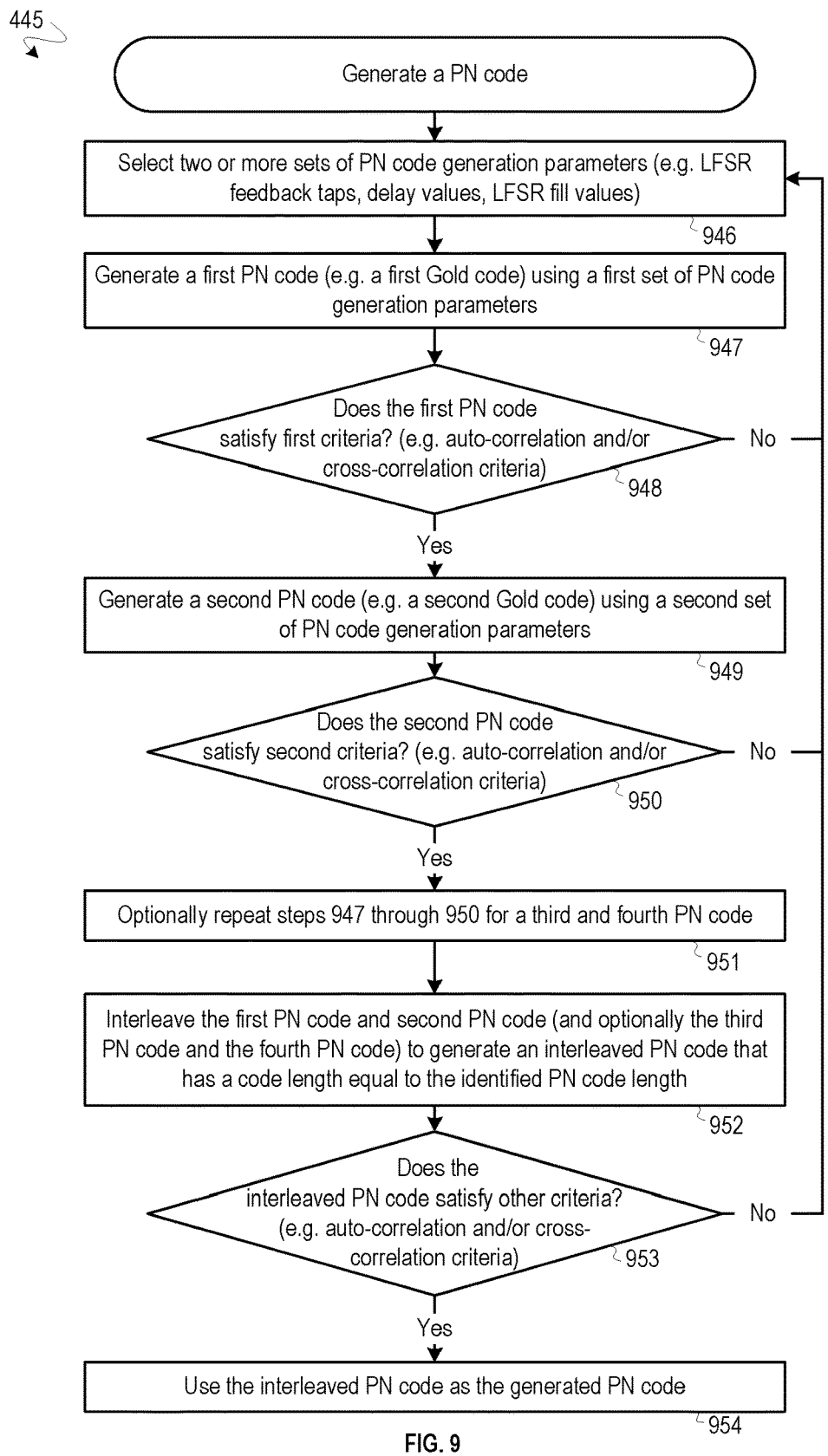
FIG. 9 provides one implementation for generating a PN code having a code length that at a chipping rate relates to an existing GNSS code duration and satisfies other criteria.

One implementation of step 445 of FIG. 4 includes sub-steps provided in FIG. 9. As shown, two or more sets of PN code generation parameters (e.g. linear feedback shift register (LFSR) feedback taps, delay values, LFSR fill values, or other) are selected at step 946. A first PN code (e.g. a length 1023 Gold code) is generated using a first set of PN code generation parameters at step 947. A determination is made at step 948 as to whether the first PN code satisfies first criteria (e.g. autocorrelation and/or cross-correlation criteria, good zonal regions of low autocorrelation, or other as discussed below). If it is determined that the first PN code satisfies the first criteria, flow continues to step 949. However, if it is determined that the first PN code does not satisfy the first criteria, flow returns to step 946. A second PN code (e.g. a second length 1023 Gold code) is generated using a second set of PN code generation parameters at step 949. A determination is made at step 950 as to whether the second PN code satisfies second criteria (e.g. autocorrelation and/or cross-correlation criteria, good zonal regions of low autocorrelation, or other as discussed below). If it is determined that the second PN code satisfies the second criteria, flow continues to step 951. However, if it is determined that the second PN code does not satisfy the second criteria, flow returns to step 946. Steps 947 through 950 are optionally repeated to generate a third and fourth PN code (e.g. a third Gold code and a fourth Gold code). Then, at step 952, the first PN code and second PN code (and optionally the third PN code and the fourth PN code) are interleaved to generate an interleaved PN code that has a code length equal to the PN code length identified at step 435 of FIG. 4. A determination is made as to whether the interleaved PN code satisfies other criteria (e.g. autocorrelation and/or cross-correlation criteria) at step 953. If it is determined that the interleaved PN code does not satisfy the other criteria, flow returns to step 946. If it is determined that the interleaved PN code does satisfy the other criteria, flow continues to step 954. The interleaved PN code is used as the generated PN code at step 954. In one embodiment, one or more of steps 948, 950 or 953 are optional.

In one implementation, the first criteria of step 948 includes criteria that the first PN code (and optionally the third PN code) has an autocorrelation side lobe magnitude that is less than the autocorrelation peak magnitude of the first/third PN code divided by the length of the first/third PN code. In one implementation, the second criteria of step 950 includes criteria that the second PN code (and optionally the fourth PN code) has an autocorrelation side lobe magnitude that is less than the autocorrelation peak magnitude of the second/fourth PN code divided by the length of the second/fourth PN code.

In one implementation, the other criteria of step 953 includes criteria that the interleaved PN code has an autocorrelation peak to side lobe ratio greater than 50 dB in a first region, and has an autocorrelation peak to side lobe ratio greater than 40 dB in a second region, where the first region includes a region that is one or both of 1) at least +/−2500 m from the main lobe or, 2) at least +/−20 centered at zero lag, and where the second region is wider than the first region (e.g. at least +/−50 chips centered at zero lag).

In one implementation, the interleaved PN code has an autocorrelation peak to side lobe ratio greater than 50 dB in a first region, the interleaved PN code has an autocorrelation peak to side lobe ratio greater than 40 dB in a second region, the first region comprises a region that is one or both of 1) at least +/−2500 m from the main lobe, or 2) at least +/−20 chips from the main lobe, and the second region is wider than the first region.

In another implementation, the first PN code, in a first region centered at zero lag, has an autocorrelation side-lobe magnitude that is less than a first threshold magnitude, the second PN code, in a second region centered at zero lag, has an autocorrelation side-lobe magnitude that is less than the first threshold magnitude, the interleaved PN code, in a third region centered at zero lag, has an autocorrelation side-lobe magnitude that is less than a second threshold magnitude, the width of the third region is greater than a threshold width, the width of the third region is less than the sum of the width of the first region summed with the width of the second region, the first threshold magnitude is greater than 40 dB, and the second threshold magnitude is greater than 40 dB. In yet another implementation, the first threshold magnitude is less than 40 dB, and the second threshold magnitude is less than 40 dB.

Details of generating the first and second (and optionally third and fourth) PN codes are discussed in more detail later. In one embodiment, the second criteria of step 950 are the same as the first criteria of step 948. In one embodiment, the first criteria and second criteria includes criteria that the first PN code and the second PN code have good zonal region rejection and additionally have good zonal region cross-correlation rejection relative to each other, for some relative phasing between the first PN code and the second PN code.

In another embodiment, the other criteria specified at step 953 includes determining if the interleaved PN code has a low auto-correlation in a first region and that the interleaved PN code has a medium auto-correlation in a second region, where the second region is wider than the first region. This is important for receivers which may need to use long impulse response filters (e.g. IIR) to notch out tone/other spurs.

In yet another embodiment, the zonal region centered at zero lag of the first PN code is of a first width, the zonal region centered at zero lag of the second PN code is of a second width, and the zonal region centered at zero lag of the interleaved PN code is of a third width. In one embodiment, the sum of the first width and the second width is greater than the third width, where the third width is greater than a threshold.

Zonal Region Size Considerations

As was discussed above, two or more 1023 length Gold codes each with a desired zonal region adjacent to the autocorrelation peak, in which the side lobe magnitudes are at most $1/1023$ time the peak, may be interleaved to generate an interleaved PN code with a length that is a multiple of the base 1023 length and which also has desired zonal region rejection. There are at least two basic zonal region sizes that may be considered depending upon system requirements: (1) a zonal region size that is similar to that of PN codes to be interleaved, as measured in seconds, for the longer interleaved PN code; and (2) a zonal region size that is similar to that of the PN codes to be interleaved, as measured in chips, for the longer PN interleaved code.

In the case of zonal region size consideration (1) identified above, if the zonal region was +/−10 chips adjacent to the autocorrelation peak for a positioning signal with a bandwidth of 1 MHz, then the zonal region would be +/−20 chips adjacent to the autocorrelation peak for a positioning signal having a bandwidth of 2 MHz, +/−40 chips for a positioning signal having a bandwidth of 4 MHz, and so on. In the case of zonal region size consideration (2) identified above, the zonal regions are similar in chips for all positioning signal bandwidths.

Zonal region size consideration (1) is more difficult to implement than zonal regions size consideration (2). Zonal region size consideration (1) also places a greater processing burden on the positioning module (e.g. high-resolution positioning algorithms such as MUSIC as well as other correlation hardware). The zonal region size consideration (1) also ensures that a multipath zonal region as specified in seconds is maintained. For example, a zonal region of 10 chips at a 1 MHz chip rate corresponds to multipath signals in a range of +/−3000 meters relative to a peak received signal. Reducing this range, as in requirement of zonal region size consideration (2) can result in missing direct path or low excess delay signals relative to the strongest received path. Hence zonal region size consideration (1) may be more desirable than zonal region size consideration (2) in terms of system performance.

Generating PN Codes for Interleaving

In one embodiment, each of the first PN code, the second PN code (and optionally third PN code and fourth PN code) are Gold codes. As discussed earlier with reference to step 952, a first PN code ("Gold code 1") and a second PN code ("Gold code 2") are interleaved to generate an interleaved PN code. Gold Code 1 is generated at step 947 of FIG. 9. Gold Code 2 is generated at step 949 of FIG. 9. In one embodiment, Gold code 1 and Gold code 2 are selected together as a pair.

The step of generating Gold code 1 may include sub-steps of identifying constituent PN codes used to generate the selected Gold code and then constructing the Gold code using the constituent PN codes. For example, Gold code 1 and Gold code 2 may be generated using a first constituent PN code $PN_a$ and a second constituent PN code $PN_b$. In one embodiment, $PN_a$ is generated with a linear feedback shift register (LFSR) using feedback taps [3, 10], and $PN_b$ is generated with an LFSR using feedback taps [2,3,6,8,9,10]. Each Gold code is generated by combining $PN_a$ and $PN_b$ using an exclusive-OR operation, where $PN_b$ is delayed relative to $PN_a$ before the exclusive-OR operation is performed. The generated Gold codes are then interleaved to generate the interleaved PN code. One method of interleaving is where Gold code 1 and Gold code 2 are interleaved such that the even numbered chips of the resultant interleaved PN code are of Gold code 1 and the odd numbered chips of the resultant interleaved PN code are of Gold code 2 (with the aforementioned delay). A relative delay between the first and second Gold codes is selected such that a low region of cross-correlation, such as −30 dB, is achieved to be nearly center relative to the autocorrelations.

A table showing example sets of PN code generation delay parameters for generating two PN codes is illustrated in FIG. 10. The first column of the table designates an interleaved code pair number. The interleaved code is generated by interleaving a pair of Gold codes (i.e. Gold code 1 and Gold code 2). Columns two and three of the table depict the delays of a constituent code $PN_b$ relative to a constituent code $PN_a$, given that both $PN_a$ and $PN_b$ have the same initial fill. Column four of the table depicts an extra delay of Gold code 2 relative to Gold code 1. This extra delay ensures that the cross-correlation run is centered on the autocorrelation peak, except for a delay of −1 to compensate for the interlacing delay of 1. Column five of the table depicts the total cross correlation run L. If the total cross-correlation run length L is odd, then the center of the run (sample (L+1)/2) is coincident with the autocorrelation peak. If the run length L is even, then the correlation run sample L/2 is coincident with the autocorrelation peak. Column six of the table depicts the resultant zonal length of the interleaved code pair.

As shown in column two of row one, Gold code 1 is generated with constituent PN codes $PN_a$ and $PN_b$, where the maximal of $PN_b$ has a relative delay of 853 samples relative to the maximal of $PN_a$. Likewise, as shown in column three of row one, Gold code 2 is generated with constituent PN codes $PN_a$ and $PN_b$, where the maximal of $PN_b$ has a relative delay of 818 samples relative to the maximal of $PN_a$. Gold code 1 and Gold code 2, generated using the parameters of row one, have autocorrelation functions with zonal regions of sizes +/−25 and +/−13 respectively (not shown).

Column four of row one shows an additional delay of 711 samples applied to Gold code 2 relative to Gold code 1 before interleaving in order to generate a preferred zonal width. Note that the delay shown in column four of row one is actually 712 samples, however the inserted delay is 1 less than the center of the cross-correlation run to compensate for a delay of 1 sample in the interleaving procedure. As shown in column five of row one, the total cross-correlation run for the delay of 712 samples is shown to be 30. The resulting 2046 length interleaved PN code has a zonal length of 27, as shown in column six of row one.

For the 16 pairs of interleaved PN codes (Gold codes) shown in the table of FIG. 10, the length of the zonal region of the interleaved codes is at least 24. The autocorrelation zonal length of the composite interleaved codes is shown in the last column of the table. If the PN codes are restricted to the best 14 codes, the zonal region is at +/−25 chips or better. For some positioning systems this is a sufficient number of codes for the system, and is comparable to +/−12.5 chips at the 1 MHz rate.

System for Interleaving Two PN Codes Using Delay Modules

Figure 11:
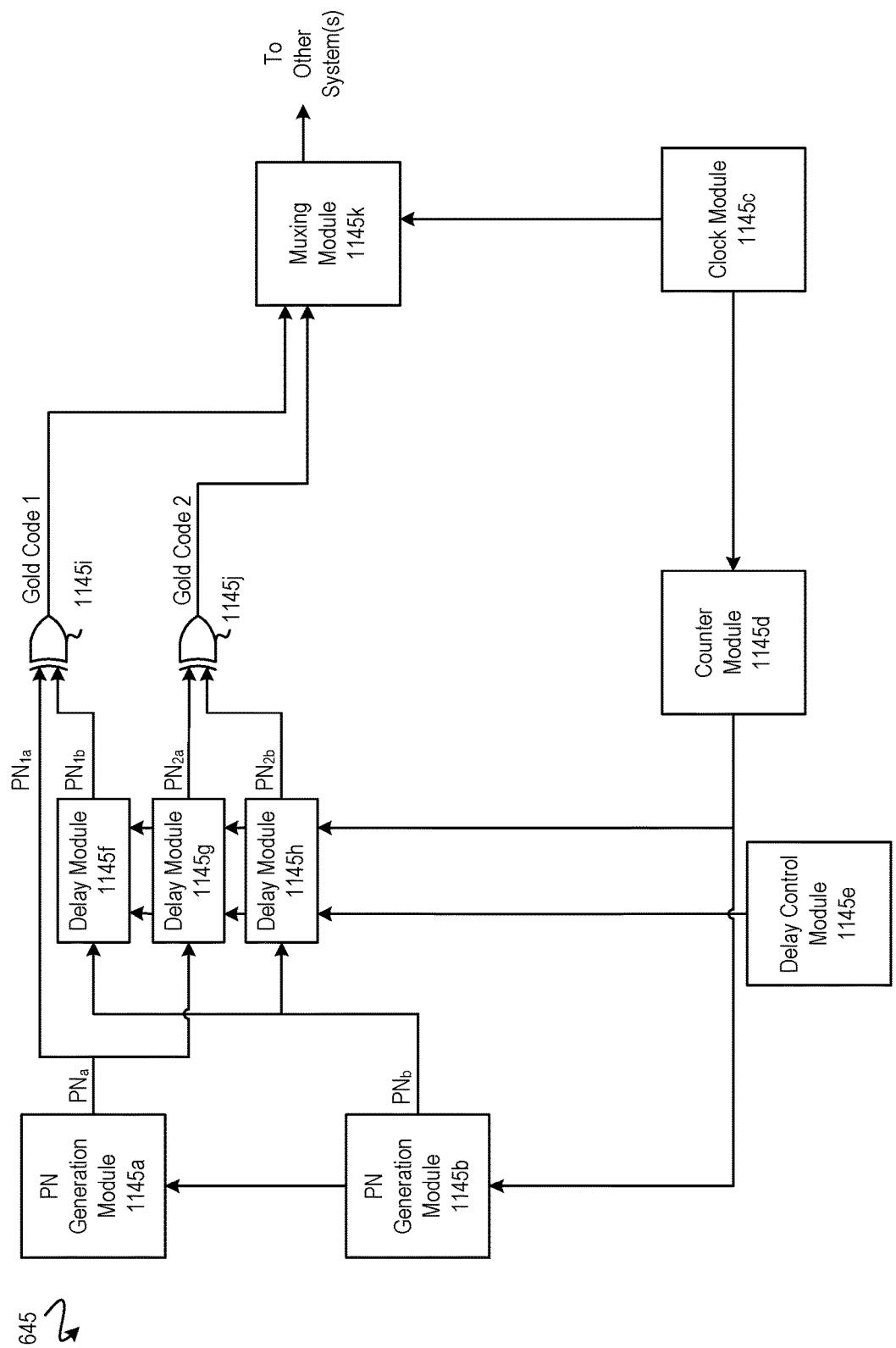
FIG. 11 depicts one embodiment of a system for interleaving two PN codes using delay modules.

A system for interleaving two PN codes (e.g. Gold code 1 and Gold code 2) using delay modules is depicted in FIG. 11. As shown, the modules may include: PN generation modules 1145a-b; a clock module 1145c; a counter module 1145d; a delay control module 1145e; delay modules 1145f-h; exclusive-OR modules 1145i-j; and a muxing module 1145k. As shown, the clock module 1145c is coupled to the counter module 1145d and to the muxing module 1145k. The counter module 1145d is coupled to the delay modules 1145f-h and is coupled to the PN generation modules 1145a-b. The delay control module 1145e is coupled to the delay modules 1145f-h. The PN generation modules 1145a-b are coupled to the delay modules 1145f-h. The PN generation module 1145a is coupled to the exclusive-OR module 1145i. The delay modules 1145f-h are coupled to the exclusive-OR modules 1145i-j, and the exclusive-OR modules 1145i-j are coupled to the muxing module 1145k. The delay control module 1145e is operable to use delay values as specified in the table shown in FIG. 10 to control the delay values of the delay modules 1145f-h.

A first constituent PN code $PN_{1a}$ is generated by the PN generation module 1145a with no delay. A second constituent PN code $PN_{1b}$ is generated by the PN generation module 1145b. $PN_{1b}$ is delayed by the delay module 1145f. $PN_{1a}$ and $PN_{1b}$ are combined by the exclusive-OR module 1145i to generate the first PN code ("Gold code 1"). A third constituent PN code $PN_{2a}$ is generated by the output PN generation module 1145a delayed by the delay module 1145g. A fourth constituent PN code $PN_{2b}$ is generated by the output PN generation module 1145b delayed by the delay module 1145h. $PN_{2a}$ and $PN_{2b}$ are combined by the exclusive-OR module 1145j to generate the second PN code ("Gold code 2"). Gold code 1 and Gold code 2 are interleaved by the muxing module 1145k to generate the interleaved PN code. As discussed with reference to column four of the table shown in FIG. 10, an additional delay may be inserted to further offset Gold code 2 from Gold code 1 (e.g. the first chip of Gold code 2 is offset from the first chip of Gold code 1).

In one embodiment, the muxing module 1145k interleaves the two Gold codes (including the various delays) by taking a first chip from each of Gold code 1 and Gold code 2, then a second chip from each of Gold code 1 and Gold code 2, and so on. It is also possible to interleave two codes in other ways. In some embodiments, signs of each of the Gold codes used for interleaving may be altered.

System for Interleaving Two PN Codes Using PN Generator Fill Values

Since implementing the delay modules 1145f-h can be more complex than implementing the PN generation modules 1145a-b, some embodiments interleave PN codes by loading initial PN generator fill values into constituent PN code generators to offset constituent PN codes from one another, which are then used to generate the two PN codes (e.g. two Gold codes). A table showing example sets of PN code generation fill parameters for generating two PN codes is illustrated in FIG. 12. Four constituent PN codes ($PN_{1a}$, $PN_{1b}$, $PN_{2a}$, $PN_{2b}$) are generated using initial fill values to offset the codes from one another. The fill values shown in columns two through five of the table incorporate the delays of column two through four of the table shown in FIG. 10. Note that the first 10 outputs of the PN code generator shift registers are the fill values read from left to right.

Figure 13:
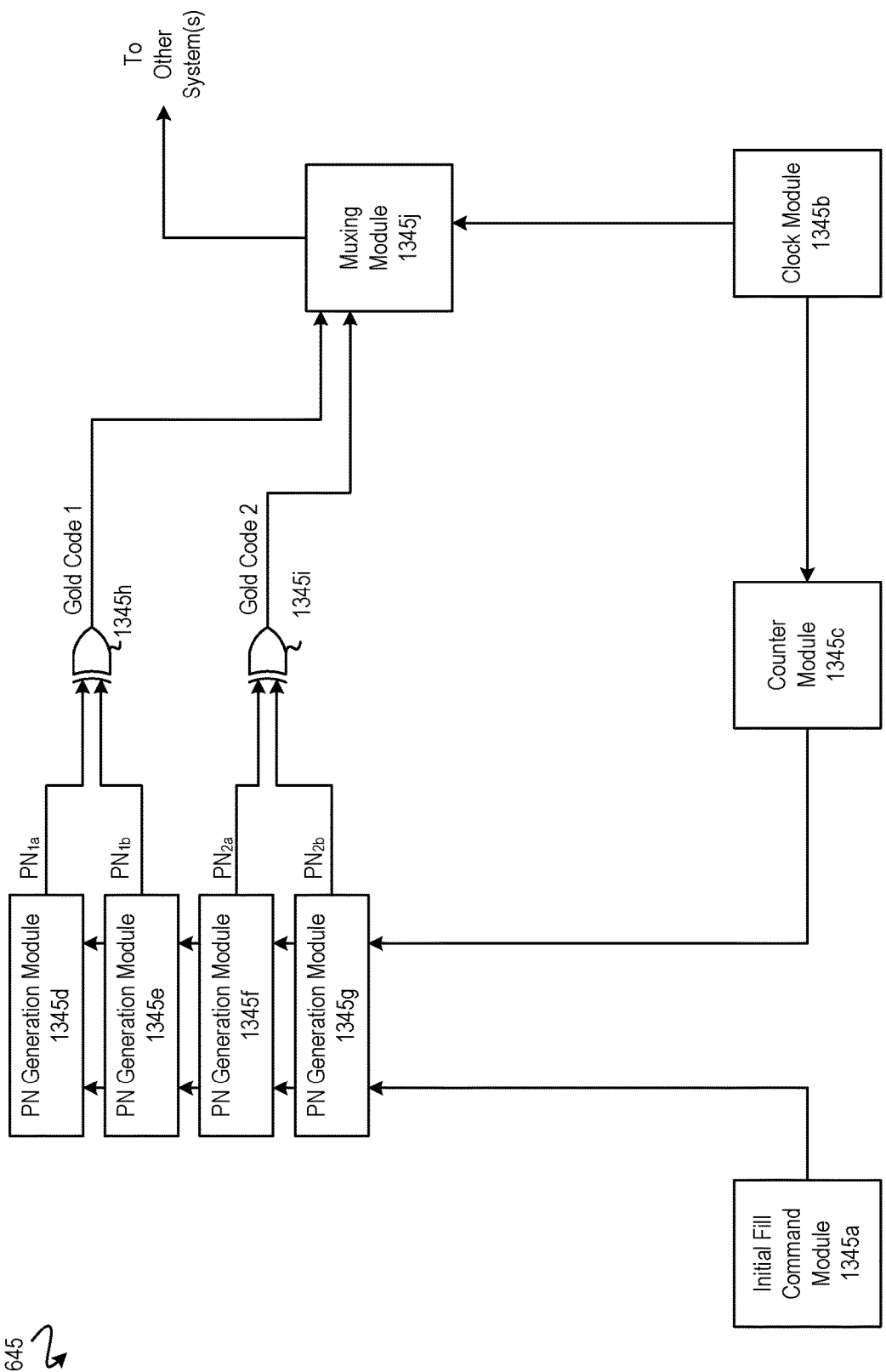
FIG. 13 depicts another embodiment of a system for interleaving two PN codes using fill values.

A system for interleaving a two PN codes using fill values is depicted in FIG. 13. As shown, the system uses a series of PN code generators instead of delay modules to offset the constituent PN codes from one another. The modules may include: an initial fill command module 1345a; a clock module 1345b; a counter module 1345c; PN generation modules 1345d-g; exclusive-OR modules 1345h-i; and a muxing module 1345j. The clock module 1345b is coupled to the muxing module 1345j and to the counter module 1345c. The counter module 1345c is coupled to the PN generation modules 1345d-g. The initial fill command module 1345a is coupled to the PN generation modules 1345d-g. The PN generation modules 1345d-g are coupled to the exclusive-OR modules 1345h-i, and the exclusive-OR modules 1345h-i are coupled to the muxing module 1345j.

The initial fill command module 1345a is operable to load initial fill values from columns two through five of the table shown in FIG. 12 into the PN generation modules 1345d-g. Constituent PN codes $PN_1a$ and $PN_{1b}$ are combined by the exclusive-OR module 1345h to generate Gold code 1. Constituent PN codes $PN_{2a}$ and $PN_{2b}$ are combined by the exclusive-OR module 1345i to generate Gold code 2. Gold code 1 and Gold code 2 are then interleaved by the muxing module 1345j. In one embodiment, the muxing module 1345j interleaves the two Gold codes (including the various delays) by taking a first chip from each of Gold code 1 and Gold code 2, then a second chip from each of Gold code 1 and Gold code 2, and so on. Note that it is also possible to interleave two codes in other ways. Also, the signs of the Gold codes may be altered, that is, the signs of each of the Gold codes used for interleaving may be altered.

Figure 14:
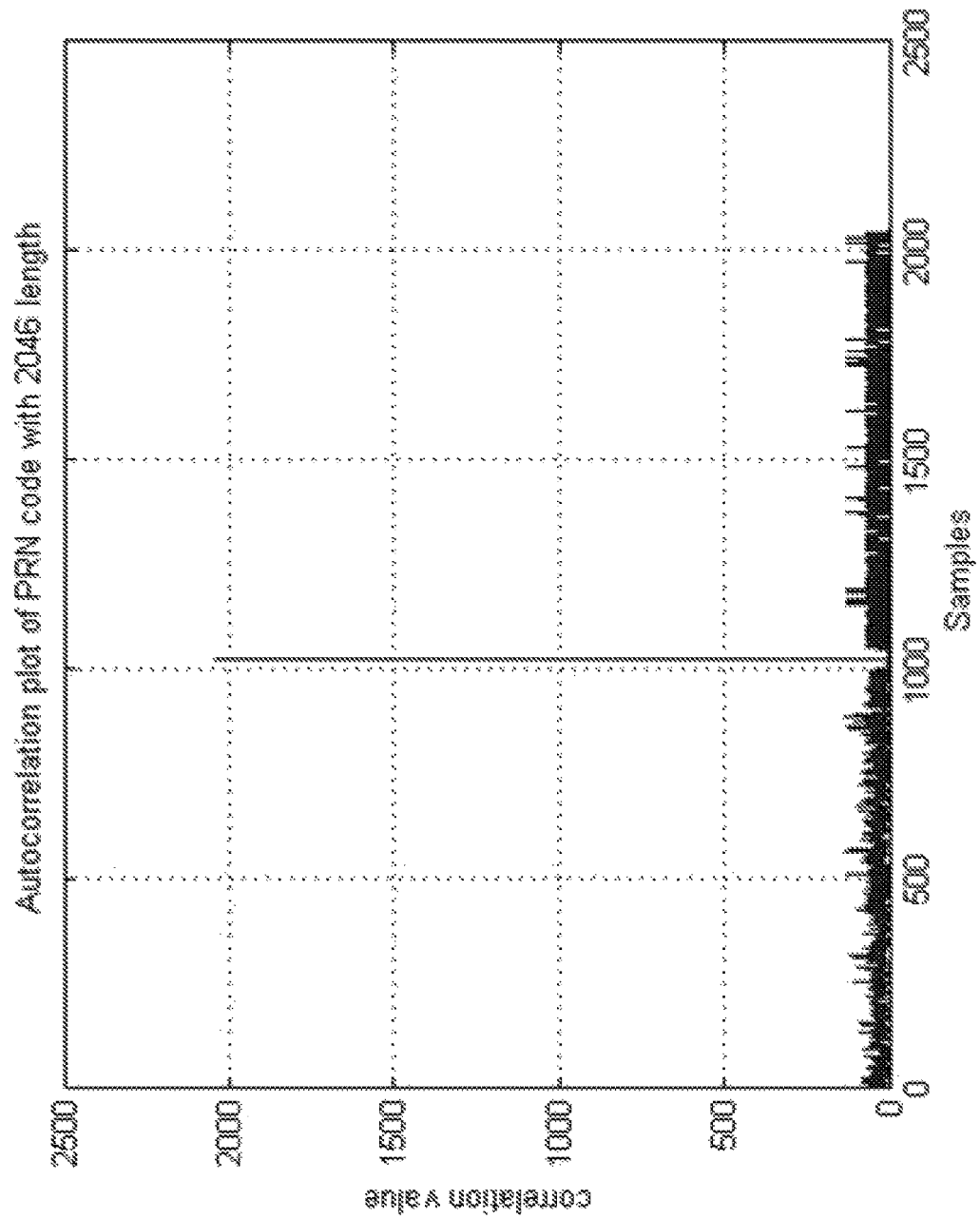
FIG. 14 depicts an autocorrelation plot of a PN code generated by interleaving two PN codes.
Figure 15:
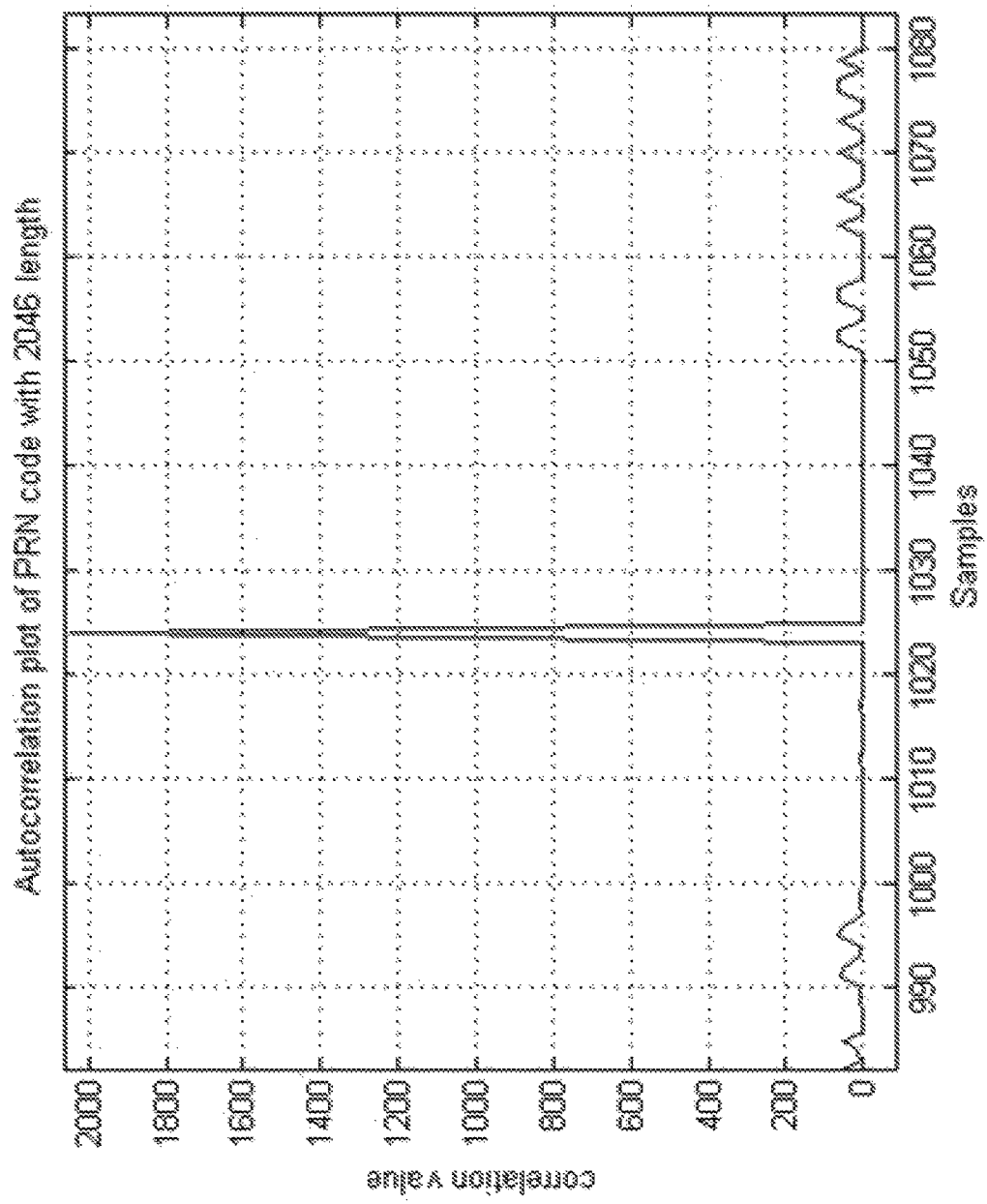
FIG. 15 depicts a magnified view of an autocorrelation plot of a PN code generated by interleaving two PN codes.

An autocorrelation plot of the 2046 length PN code generated by interleaving two 1023 length PN codes is depicted in FIG. 14, and a magnified view of the autocorrelation plot of a PN code generated by interleaving two PN codes is depicted in FIG. 15. The zonal region is considered to be the region surrounding the autocorrelation peak where the autocorrelation values of less than or equal to two. The zonal region of the interleaved PN code may be found as follows: if the one-sided autocorrelation's zonal region is at least $M_a$ chips, and the one-sided zonal region of the cross-correlations are at least $M_c$ chips, then the new one sided zonal region will be $>=K \times (\min(M_a, M_c))$, where K is the number of interleaved PN codes (e.g. 2). In one example, the one-sided zonal autocorrelation regions are 25 and 13 chips, and the one-sided cross correlation is 14 chips (total cross-correlation is 30, so 14 chips are one side of a desired location and 15 are on the other side). Hence, $M_a=13$ and $M_c=14$ and thus the one-sided region is $>=2 \times 13$ or 26. The exact zonal region size is 27. The reason for this is that the one sided cross-correlation zonal length exceeds the one-sided autocorrelation zonal length of the second code. FIG. 14 shows the autocorrelation for the PN code with length 2046, and FIG. 15 shows a close up of the region around the autocorrelation peak. As can be seen in FIG. 15, the zonal region is +/−27 chips about the peak. In the zonal region the peak autocorrelation magnitude is two and hence its ratio relative to the overall peak of 2046 is 1023, just as in the 1023 length Gold code case.

Interleaving Four PN Codes

Four Gold codes may be interleaved to generate the interleaved PN code. In one embodiment, four 1023 length PN codes are interleaved to generate a length 4092 PN code. As shown in FIG. 3 a length 4092 PN code relates to the PN code length of Galileo E1B PN codes. As was discussed with respect to FIG. 9, steps 947 through 950 of FIG. 9 are optionally repeated to generate a third and a fourth PN code (Gold code 3 and Gold code 4). The four PN codes are then interleaved. However, identifying four PN codes that satisfy autocorrelation and cross-correlation criteria (e.g. a code of length 1023 with cross-correlation zonal regions of magnitude 1/1023) may be more difficult than identifying two such PN codes. In one embodiment, the criteria of the magnitude of the maximum side-lobes of the zonal region is relaxed in order to identify four suitable PN codes.

The plots of FIG. 14 and FIG. 15 illustrate long regions of autocorrelations with values that are a maximum of 66 dB, and a ratio of peak autocorrelation 66/2046=0.03225 (−29.8 dB). This contrasts with Gold codes where, except for the zonal region of size 1/1023, the other regions have maximal of magnitude 65/1023=0.0635 (−23.9 dB). Hence, there is a gain of around 6 dB for these secondary side-lobes. This provides additional opportunities when examining longer codes to achieve autocorrelations with acceptable side-lobes over a wide zonal region. In particular, a PN code of length 4092 may result in a large zonal region with maximum side-lobes on the order of 65/4092 or around −36 dB, which should be acceptable for a high-resolution positioning algorithm. More precisely, the maximum side lobe relative to the peak for a number of codes found in this manner is determined to be 68/4092 (around −35.6 dB).

Discussion of interleaving four PN codes will briefly refer to additional sets of PN codes that may be suitable for interleaving. Thus, a table showing additional PN code generation delay parameters for generating two PN codes is illustrated in FIG. 16 and a table showing additional PN code generation fill parameters for generating two PN codes is illustrated in FIG. 17.

In order to interleave four PN codes, two PN code pairs are selected from the table of FIG. 10 and/or the table of FIG. 16 (or equivalently from the table of FIG. 12 and/or the table of FIG. 17). The second PN code pair is further delayed relative to the first PN code pair to optimize the zonal region, where maximum side lobe in the region is allowed to be less than 70/4092. The delay applied between the PN code pairs may be chosen to generate long zonal regions of maximum magnitude (e.g. 68/4092, or −35.6 dB).

The four PN codes are then interleaved (including the various delays) where in succession four chips (or code values) are formed by taking a chip from each of the first PN code pair and then taking a chip from each of the second PN code pair. The resulting interleaved code is then of length 4092. The size of the zonal region of the interleaved PN code may vary from +/−51 chips to +/−83 chips, depending upon the PN code pair chosen.

A table of example zonal regions resulting from interleaving four PN codes using delays is depicted in FIG. 18. Column one of the table shown in FIG. 18 designates a particular interleaved code. Column two of the table indicates which code sets as designated in column one of FIG. 10 and/or FIG. 16 were interleaved to generate the resultant interleaved code. Column three of the table indicates the delay in samples of the second code set relative to the first code set. Column four of the table indicates the resultant zonal region of the interleaved code.

System for Interleaving Four PN Codes Using Delay Modules

A table of example PN code generation delay parameters for generating four PN codes is depicted in FIG. 19. In one embodiment, each of the four generated PN codes is a Gold code. As shown, the four Gold codes are constructed from eight constituent PN codes, with the delays of the individual maximal length PN codes provided in the eight columns of the table shown. In one embodiment, the output chip sequence of an interleaved PN code generated using Gold code 1 through Gold code 4 uses a chip from each of Gold code 1, Gold code 2, Gold code 3, Gold code 4 in that order, and then the constituent PN generators are shifted. In one embodiment for generating the Gold code 1 through Gold code 4, $PN_{1a}$, $PN_{2a}$, $PN_{3a}$ and $PN_{4a}$ are generated using feedback taps [3,10] of a linear feedback shift register (LFSR), and $PN_{1b}$, $PN_{2b}$, $PN_{3b}$ and $PN_{4b}$ are generated using feedback taps [2,3,6,8,9,10] of an LFSR. The maximum side lobe magnitude in the resultant zonal region is 68/4092 (−35.6 dB) relative to the correlation peak.

Figure 20:
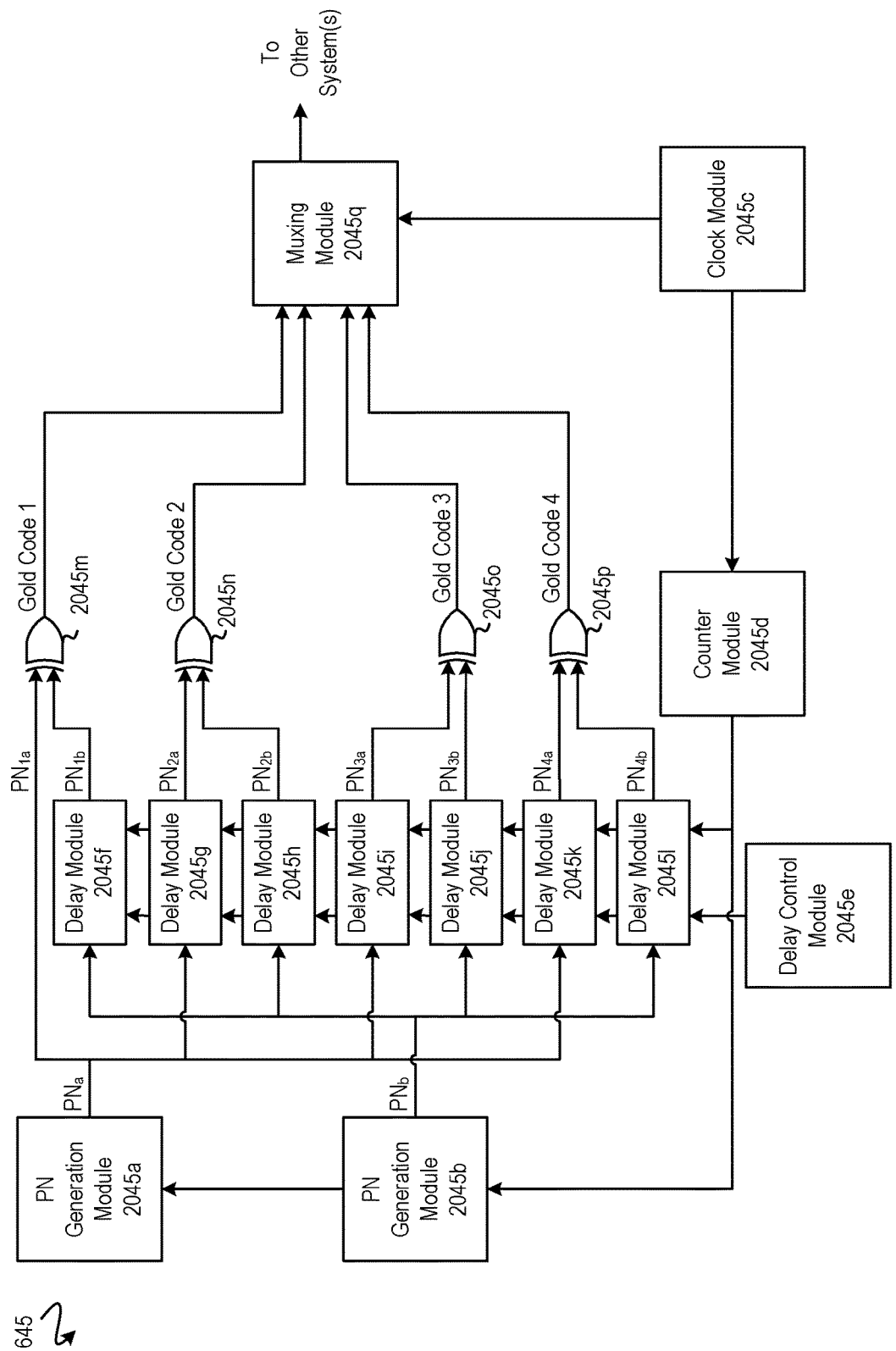
FIG. 20 depicts one embodiment of a system for interleaving four PN codes.

One embodiment of a system for interleaving four PN codes is depicted in FIG. 20. As shown, the modules may include: PN generation modules 2045a-b; a clock module 2045c; a counter module 2045d; a delay control module 2045e; delay modules 2045f-l; exclusive-OR modules 2045m-p; and a muxing module 2045q. The clock module 2045c is coupled to the counter module 2045d and is coupled to the muxing module 2045q. The counter module 2045d is coupled to the delay modules 2045f-l and is coupled to the PN generation modules 2045a-b. The delay control module 2045e is coupled to the delay modules 2045f-l. The PN generation modules 2045a-b are coupled to the delay modules 2045f-l. The PN generation module 2045a is coupled to the exclusive-OR module 2045m. The delay modules 2045f-l are coupled to the exclusive-OR modules 2045m-p, and the exclusive-OR modules 2045m-p are coupled to the muxing module 2045q. The delay control module 2045e is operable to use delay values as specified in the table shown in FIG. 19 to control the delay value of the delay modules 2045f-l.

A first constituent PN code $PN_{1a}$ is generated using the output of the PN generation module 2045a with no delay. A second constituent PN code $PN_{1b}$ is generated using the output of the PN generation module 2045b delayed by the delay module 2045f. The constituent PN codes $PN_{1a}$ and $PN_{1b}$ are combined by the exclusive-OR module 2045m to generate Gold code 1. A third constituent PN code $PN_{2a}$ is generated using the output of the PN generation module 2045a delayed by the delay module 2045g. A fourth constituent PN code $PN_{2b}$ is generated using the output PN generation module 2045b delayed by the delay module 2045h. $PN_{2a}$ and $PN_{2b}$ are combined by the exclusive-OR module 2045n to generate Gold code 2. A fifth constituent PN code $PN_{3a}$ is generated using the output of the PN generation module 2045a delayed by the delay module 2045i. A sixth constituent PN code $PN_{3b}$ is generated using the output PN generation module 2045b delayed by the delay module 2045j. $PN_{3a}$ and $PN_{3b}$ are combined by the exclusive-OR module 2045o to generate Gold code 3. A seventh constituent PN code $PN_{4a}$ is generated using the output of the PN generation module 2045a delayed by the delay module 2045k. An eighth constituent PN code $PN_{4b}$ is generated using the output PN generation module 2045b delayed by the delay module 2045l. $PN_{4a}$ and $PN_{4b}$ are combined by the exclusive-OR module 2045p to generate Gold code 4. Gold code 1 through Gold code 4 are then interleaved by the muxing module 2045q to generate the interleaved PN code. In one embodiment, the muxing module 2045q interleaves the four Gold codes (including the various delays) by taking a chip from each of Gold code 1 and Gold code 2, and then taking a chip from each of Gold code 3 and Gold code 4. Note that it is also possible to interleave the four codes in other ways, such as choosing chips from the first Gold code in each pair (e.g. Gold code 1 and Gold code 3), and then from the second Gold code in each pair (e.g. Gold code 2 and Gold code 4). The signs of each of the Gold codes used for interleaving may also be altered.

System for Interleaving Four PN Codes Using PN Generator Fill Values

A table of example PN code generation fill parameters for generating four PN codes is depicted in FIG. 21. In one embodiment, the four PN codes are Gold codes. As shown, Gold code 1 through Gold code 4 are constructed from eight constituent PN codes ($PN_{1a}$, $PN_{1b}$, $PN_{2a}$, $PN_{2b}$, $PN_{3a}$, $PN_{3b}$, $PN_{4a}$ and $PN_{4b}$), with initial fill values of the individual maximal length PN codes provided in the eight columns of the table labeled $PN_{1a,b}$ through $PN_{4a,b}$. The output chip sequence illustrated in the table of FIG. 21 is Gold Code 1, Gold Code 2, Gold Code 3, and Gold Code 4 in that order, and then the PN generators are shifted. In one embodiment for generating the Gold code 1 through Gold code 4, $PN_{1a}$, $PN_{2a}$, $PN_{3a}$ and $PN_{4a}$ have feedback taps [3,10], and $PN_{1b}$, $PN_{2b}$, $PN_{3b}$ and $PN_{4b}$ have feedback taps [2,3,6,8,9,10]. The maximum side lobe magnitude in the zonal region is 68/4092 (−35.6 dB) relative to the correlation peak.

Figure 22:
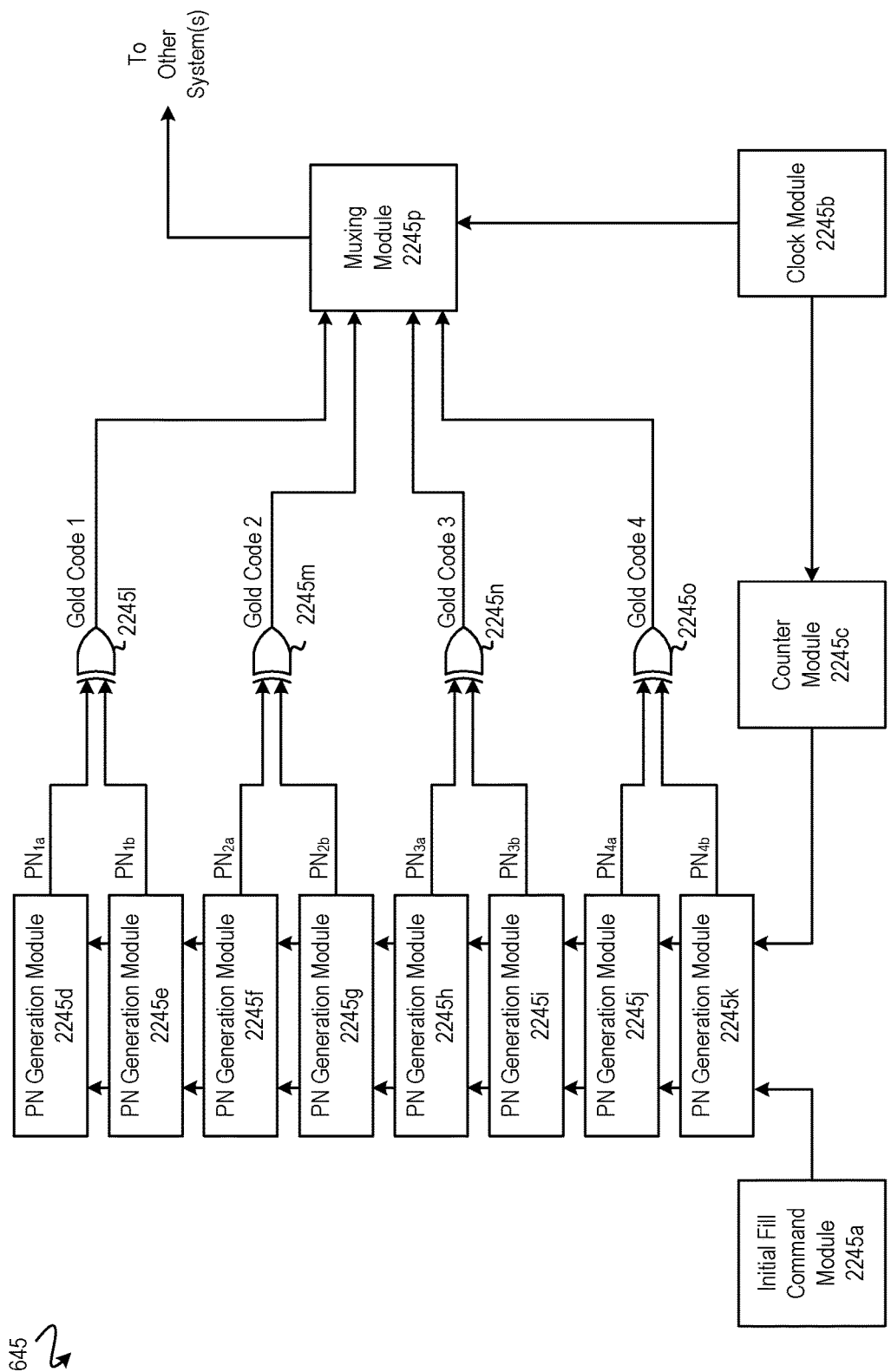
FIG. 22 depicts another embodiment of a system for interleaving four PN codes using initial fill values.

Another embodiment of a system for interleaving four PN codes using initial fill values is depicted in FIG. 22. As shown, the modules may include: an initial fill command module 2245a; a clock module 2245b; a counter module 2245c; PN generation modules 2245d-k; exclusive-OR modules 2245l-o; and a muxing module 2245p. The clock module 2245b is coupled to the muxing module 2245p and to the counter module 2245c. The counter module 2245c is coupled to the PN generation modules 2245d-k. The initial fill command module 2245a is coupled to the PN generation modules 2245d-k. The PN generation modules 2245d-k are coupled to the exclusive-OR modules 2245l-o, and the exclusive-OR modules 2245l-o are coupled to the muxing module 2245p.

The initial fill command module 2245a is operable to load initial fill values from columns two through nine of the table shown in FIG. 21 into the PN generation modules 2245d-k. As shown, constituent PN codes $PN_{1a}$ and $PN_{1b}$ are combined by the exclusive-OR module 2245l to generate Gold code 1; constituent PN codes $PN_{2a}$ and $PN_{2b}$ are combined by the exclusive-OR module 2245m to generate Gold code 2; constituent PN codes $PN_{3a}$ and $PN_{3b}$ are combined by the exclusive-OR module 2245n to generate Gold code 3; and constituent PN codes $PN_{4a}$ and $PN_{4b}$ are combined by the exclusive-OR module 2245o to generate Gold code 4. Gold code 1 through Gold code 4 are then interleaved by the muxing module 2245p to generated an interleaved PN code. In one embodiment, the muxing module 2245p interleaves the four Gold codes (including the various delays) by taking a chip from each of Gold code 1 and Gold code 2, and then taking a chip from each of Gold code 3 and Gold code 4. Note that it is also possible to interleave the four codes in other ways, such as choosing chips from the first Gold code in each pair (e.g. Gold code 1 and Gold code 3), and then from the second Gold code in each pair (e.g. Gold code 2 and Gold code 4). The signs of each of the Gold codes used for interleaving may also be altered.

In most circumstances, the embodiment shown in FIG. 22, which uses eight PN generators, requires less complexity to implement than the embodiment using delay modules shown in FIG. 20.

Figure 23:
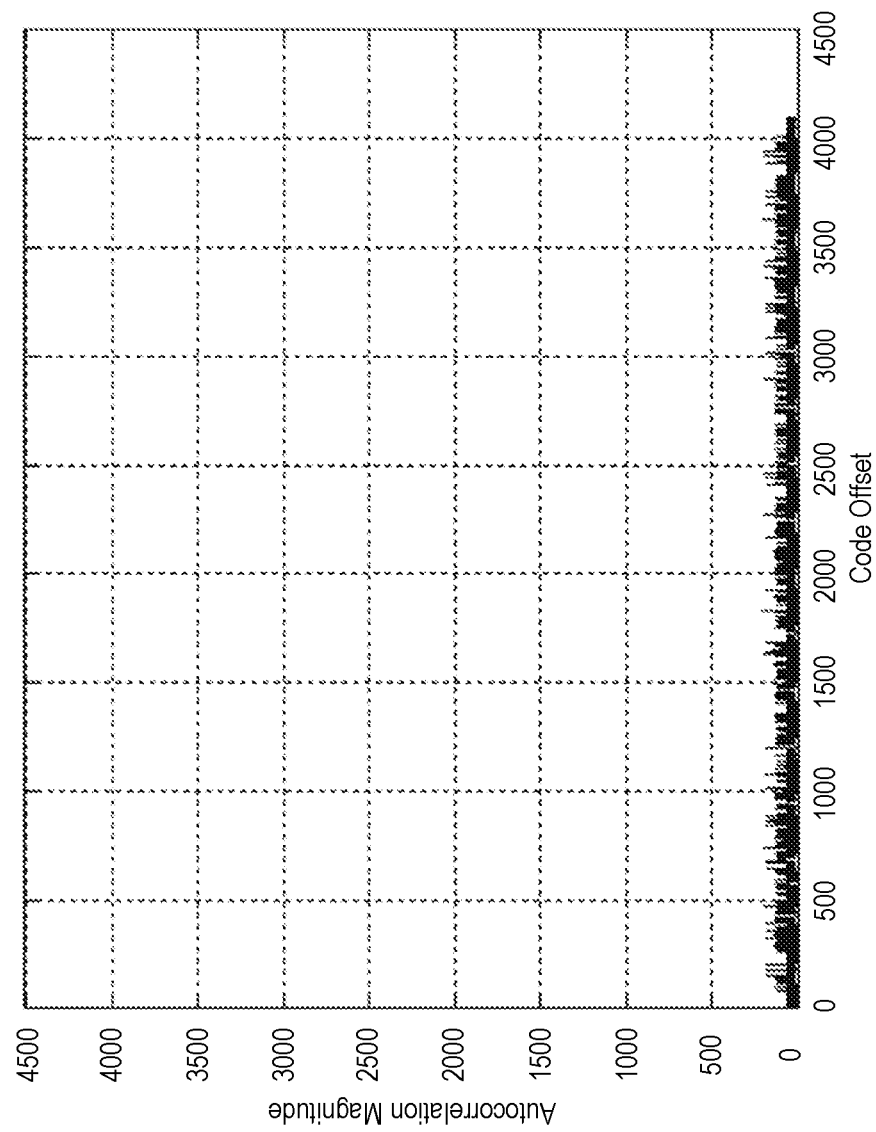
FIG. 23 depicts an autocorrelation plot of a PN code generated by interleaving a set of four PN codes.
Figure 24:
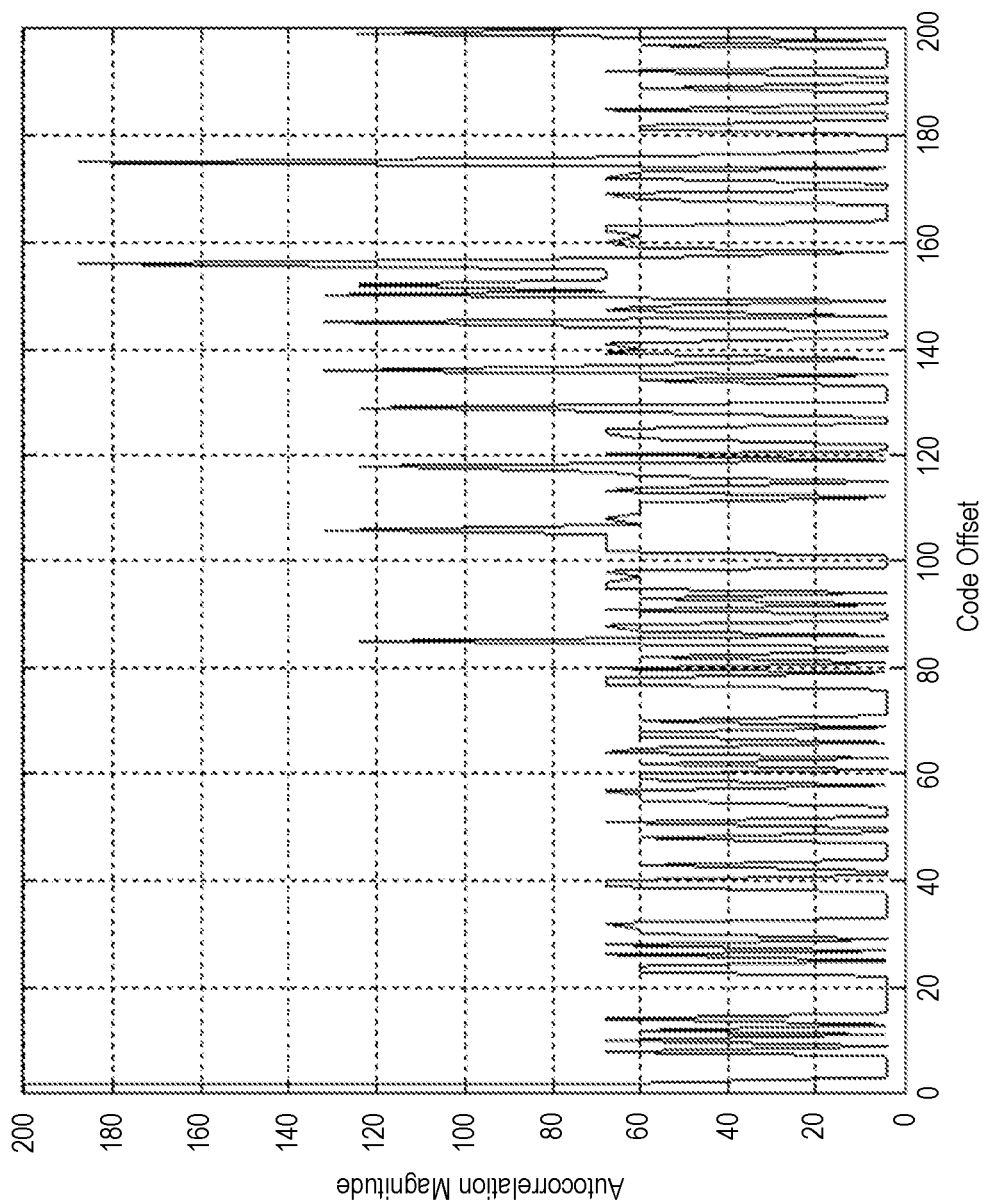
FIG. 24 depicts a magnified view of the autocorrelation plot of the PN code generated by interleaving four PN codes.

An autocorrelation plot of a PN code generated by interleaving the first set of four PN codes shown in the table of FIG. 19 (if using delay modules to offset the constituent PN codes) or FIG. 21 (if using fill values to offset constituent PN codes) is depicted in FIG. 23. A magnified view of the autocorrelation plot of the PN code generated by interleaving the four PN codes is depicted in FIG. 24. The maximum zonal side lobe level of 68/4092 is about 5.6 dB better than the peak side lobe level of Gold code of length 4095, the maximum of which is 129/4095 (−30 dB and, the length of the Gold code is not a multiple of 1023). The maximum (periodic) cross-correlation magnitude between any of the two codes is found to be 260/4092=−23.9 dB, which is essentially the same as 1023 length Gold codes. However, many of the code pairs have maximum cross-correlation value less than 260.

Generating a PN Code Using a Truncated M-Sequence

Approaches for generating a PN code by truncating a maximal length code (m-sequence) are described below. Maximal length codes have a zonal region that is essentially the code length −1. One issue with maximal length codes is that the cross-correlation between different codes is not constrained, as in the case of Gold codes. However, once the codes become long, for example 4095 in length, the maximal cross-correlation is expected to be acceptable, especially if a selection is made among a subset of such codes. Also, the performance with frequency offsets may not be significantly different than that associated with Gold codes having similar frequency offset.

A length 2046 PN code (e.g. used for Beidou) can be constructed from a length 2047 m-sequence by truncating the m-sequence to 2046 samples. Performance in a large size zonal region is expected to be good because the effect of the truncation by T chips increases the autocorrelation magnitude (normally at 1 for nonzero offset) by at least T, since T samples are no longer available to enter into the autocorrelation summation. As the code phase shifts, however, additional bit mismatches occur corresponding to the overlap of the end of the sequence and the beginning of the sequence. In general, however, the autocorrelation values are less than this worst case amount since the effects of mismatches adds errors randomly.

Figure 25:
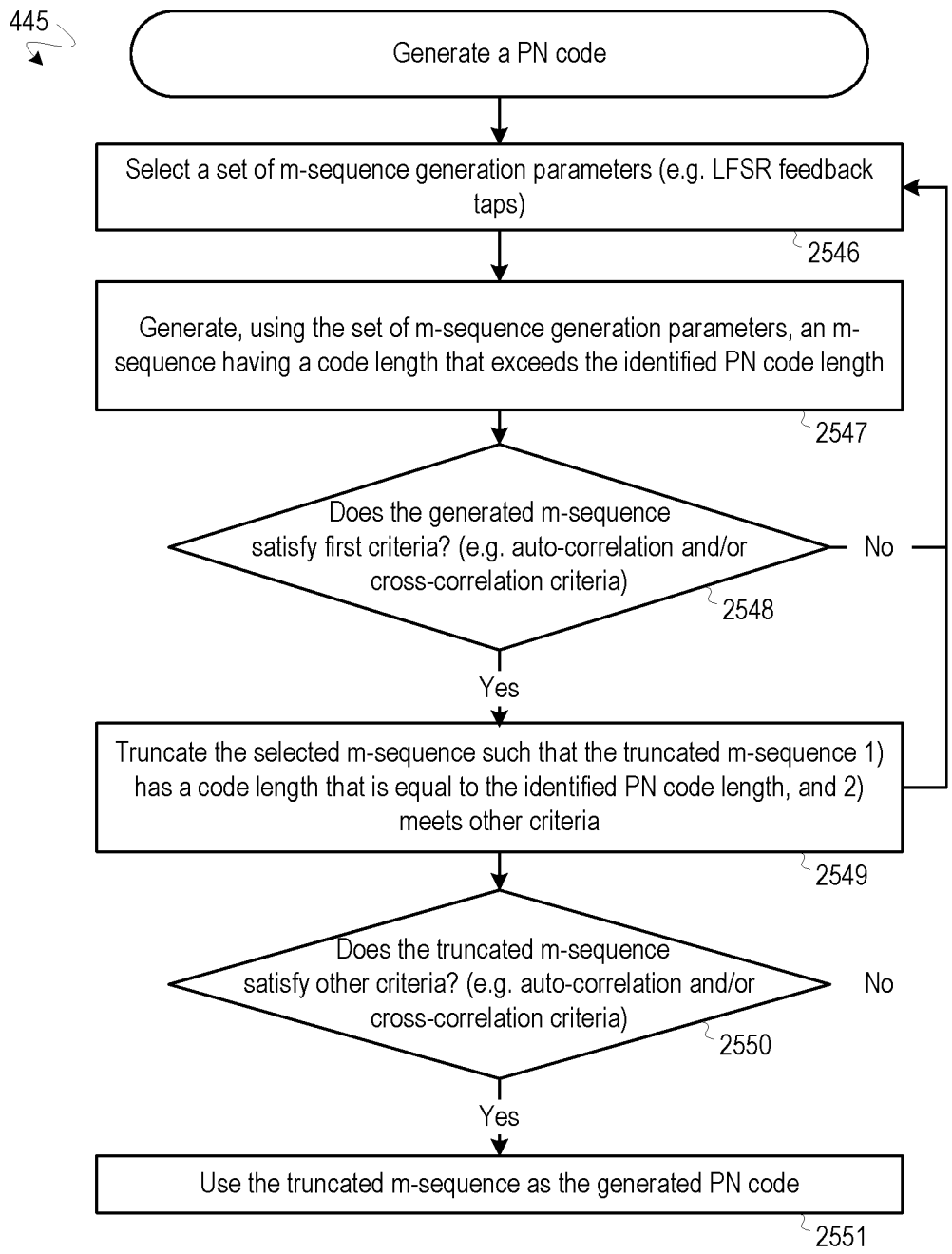
FIG. 25 depicts a process for generating a PN code that has a code length related to an existing GNSS code length and satisfies other criteria.

One process for generating a PN code that has a code length related to an existing GNSS code length and satisfies other criteria is depicted in FIG. 25. A set of m-sequence generation parameters (e.g. LFSR feedback taps, or other) are selected at step 2546. At step 2547, an m-sequence having a code length that exceeds the PN code length identified at step 435 of FIG. 4 is generated using the set of m-sequence generation parameters. A determination is made as to whether the generated m-sequence satisfies first criteria (e.g. autocorrelation and/or cross-correlation criteria) at step 2548. If it is determined that the generated m-sequence does not satisfy the first criteria, flow returns to step 2546. If it is determined that the generated m-sequence satisfies the first criteria, flow continues to step 2549. At step 2549, the selected m-sequence is truncated such that the truncated m-sequence 1) has a code length equal to the PN code length identified at step 435 of FIG. 4, and 2) meets other criteria. A determination is made as to whether the truncated m-sequence satisfies the other criteria (e.g. autocorrelation and/or cross-correlation criteria) at step 2550. If it is determined that the truncated m-sequence does not satisfy the other criteria, flow returns to step 2546. If it is determined that the truncated m-sequence satisfies the other criteria, flow continues to step 2551. The truncated m-sequence is used as the generated PN code at step 2551.

The other criteria specified at step 2550 includes determining if the truncated m-sequence has a low auto-correlation in a first region and the truncated m-sequence has a medium auto-correlation in a second region. In one implementation, the other criteria of step 2550 includes criteria that the truncated m-sequence has an autocorrelation peak to side lobe ratio greater than 50 dB in a first region, and has an autocorrelation peak to side lobe ratio greater than 40 dB in a second region, where the first region includes a region that is at least +/−20 chips centered at zero lag, and where the second region is wider than the first region.

The cross-correlation performance of maximal length codes may be poor, unless the codes are chosen judiciously. A table of truncated maximal length codes is shown at FIG. 26. The zonal region of the truncated maximal length codes shown in the table satisfy criteria of having a zonal region amplitude of <=6. The first column of the table shows a code reference number. Each row of the second column is a listing of feedback taps used to generate the particular length 2047 m-sequence using an eleven stage (R11) linear feedback shift register (LFSR). Each row of the third column shows the zonal region length in chips adjacent to the autocorrelation peak of the length 2046 truncated code. Each row of the fourth column shows which PN chip is deleted from the length 2047 m-sequence in order to generate the truncated length 2046 code.

In one implementation, the truncated m-sequence has an autocorrelation peak to side lobe ratio greater than 50 dB in a first region, the truncated m-sequence has an autocorrelation peak to side lobe ratio greater than 40 dB in a second region, the first region comprises a region that is one or both of 1) at least +/−2500 m from the main lobe, or 2) at least +/−20 chips from the main lobe, and the second region is wider than the first region.

In another implementation, the m-sequence, in a first region centered at zero lag, has an autocorrelation side-lobe magnitude that is less than a first threshold magnitude, the truncated m-sequence, in a second region centered at zero lag, has an autocorrelation magnitude that is less than a second threshold magnitude; the first threshold magnitude is greater than 40 dB, and the second threshold magnitude is greater than 40 dB. In yet another implementation, the first threshold magnitude is less than 40 dB and the second threshold magnitude is less than 40 dB.

Truncated codes may be chosen with acceptable cross-correlation performance at zero frequency offset. In addition, by altering the initial fill of an m-sequence prior to truncation, the cross-correlation performance may be affected. However, some simulation indicates that the reduction afforded by choosing different initial fills is small, around 15%. Hence, the largest improvement would be afforded by choosing a better set of codes (e.g. a set of codes that meet the criteria).

Figure 27:
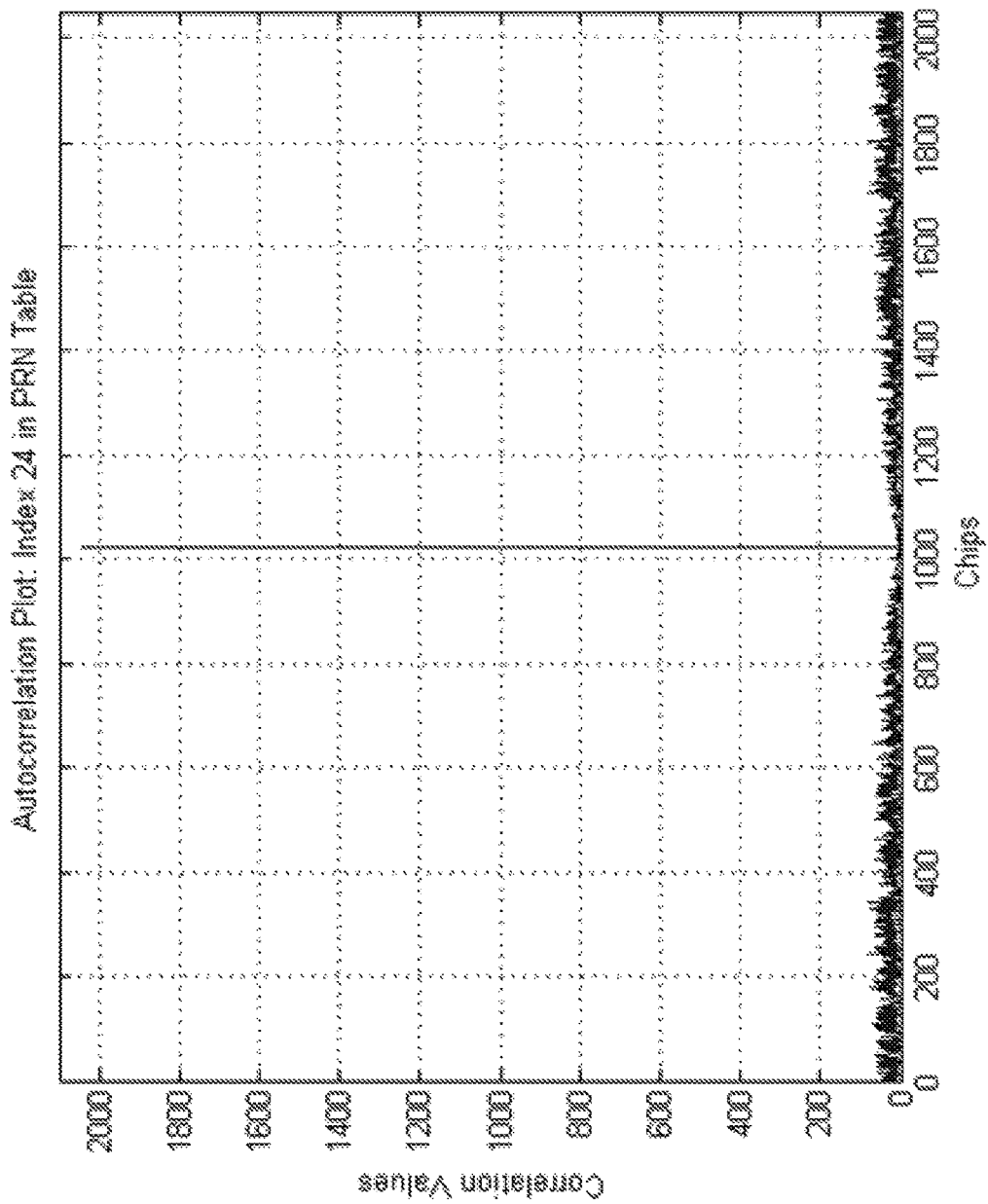
FIG. 27 depicts an autocorrelation plot of a PN code generated by truncating a maximal-length PN code.
Figure 28:
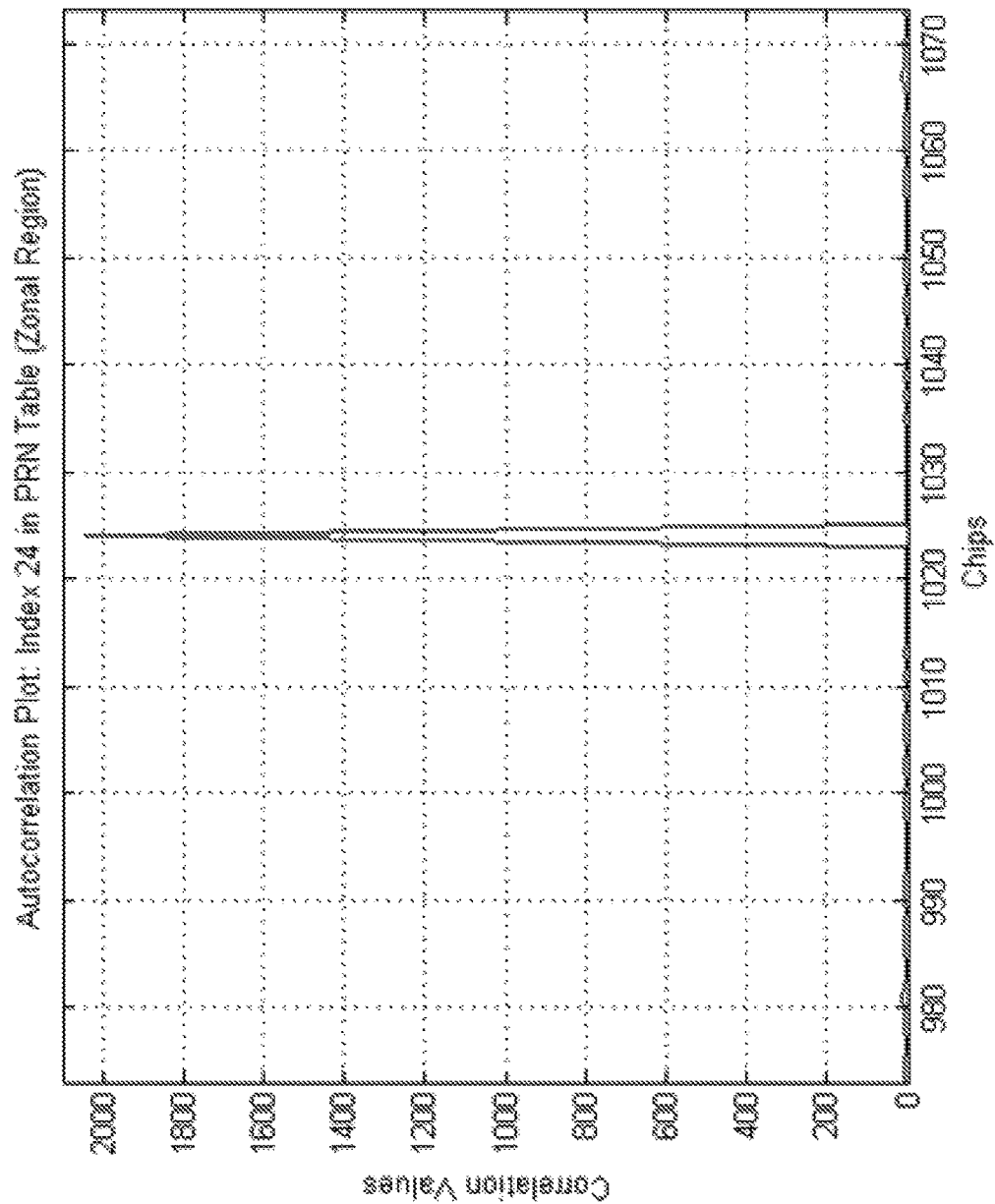
FIG. 28 depicts a magnified view of an autocorrelation plot of a PN code generated by truncating a maximal-length PN code.

An autocorrelation plot of a PN code generated by truncating a maximal-length PN code is depicted in FIG. 27, and a magnified view of an autocorrelation plot of a PN code generated by truncating a maximal-length PN code is depicted in FIG. 28. The zonal region is considered such that correlation value <=6. As such, the peak to zonal region (+/−25 chips) side lobe ratio is 20 log 10(2046/6)~=50 dB. The peak to close-in (+/−50 chips) side lobe ratio is 20 log 10(2046/12)~=44 dB.

Other Aspects

Methods of this disclosure may be implemented by hardware, firmware or software. One or more non-transitory machine-readable media embodying program instructions that, when executed by one or more machines, cause the one or more machines to perform any of the described methods are also contemplated. As used herein, machine-readable media includes all forms of statutory machine-readable media (e.g. statutory non-volatile or volatile storage media, statutory removable or non-removable media, statutory integrated circuit media, statutory magnetic storage media, statutory optical storage media, or any other statutory storage media). As used herein, machine-readable media does not include non-statutory media. By way of example, machines may include one or more computing device(s), processor(s), controller(s), integrated circuit(s), chip(s), system(s) on a chip, server(s), programmable logic device(s), other circuitry, and/or other suitable means described herein or otherwise known in the art.

Method steps described herein may be order independent, and can therefore be performed in an order different from that described. It is also noted that different method steps described herein can be combined to form any number of methods, as would be understood by one of skill in the art. It is further noted that any two or more steps described herein may be performed at the same time. Any method step or feature disclosed herein may be expressly restricted from a claim for various reasons like achieving reduced manufacturing costs, lower power consumption, and increased processing efficiency. Method steps performed by a transmitter or a receiver can be performed by a server, or vice versa.

Systems comprising one or more modules that perform, are operable to perform, or adapted to perform different method steps/stages disclosed herein are also contemplated, where the modules are implemented using one or more machines listed herein or other suitable hardware.

When two things (e.g. modules or other features) are "coupled to" each other, those two things may be directly connected together (e.g. shown by a line connecting the two things in the drawings), or separated by one or more intervening things. Where no lines and intervening things connect two particular things, coupling of those things is contemplated unless otherwise stated. Where an output of one thing and an input of another thing are coupled to each other, information (e.g. data and/or signaling) sent from the output is received by the input even if the data passes through one or more intermediate things. All information disclosed herein may be transmitted over any communication pathway using any protocol. Data, instructions, commands, information, signals, bits, symbols, and chips and the like may be represented by voltages, currents, electromagnetic waves, magnetic fields or particles, or optical fields or particles.

The words comprise, comprising, include, including and the like are to be construed in an inclusive sense (i.e. not limited to) as opposed to an exclusive sense (i.e. consisting only of). Words using the singular or plural number also include the plural or singular number, respectively. The word or and the word and, as used in the Detailed Description, cover any of the items and all of the items in a list. The words some, any and at least one refer to one or more. The term may is used herein to indicate an example, not a requirement—e.g. a thing that may perform an operation or may have a characteristic need not perform that operation or have that characteristic in each embodiment, but that thing performs that operation or has that characteristic in at least one embodiment.

By way of example, transmitters described herein may include: antenna module(s) for exchanging signals with other systems (e.g. satellites, other transmitters, receivers, a server); RF front end module(s) with circuitry components (e.g. analog/digital logic and power circuitry, tuning circuitry, buffer and power amplifiers, and other components as is known in the art or otherwise disclosed herein); processing module(s) for performing signal processing (e.g. generating signals for transmission to other systems at a selected time, using a selected frequency, using a selected code, and/or using a selected phase), methods described herein, or other processing; memory module(s) for providing storage and retrieval of data and/or instructions relating to methods of operation described herein that may be executed by the processing module(s); sensors module(s) for measuring conditions at or near the transmitter (e.g. pressure, temperature, humidity, wind, or other conditions); and/or interface module(s) for exchanging information with other systems via other links other than a radio link. Signals transmitted by a transmitter may carry different information that, once determined by a receiver or a server, may identify the following:

the transmitter that transmitted the signal; the location (LLA) of that transmitter; pressure, temperature, humidity, and other conditions at or near that transmitter; and/or other information.

A receiver may be in the form of a computing device (e.g. a mobile phone, tablet, laptop, digital camera, tracking tag). A receiver may also take the form of any component of the computing device, including a processor. By way of example, a receiver may include: antenna module(s) for exchanging signals with other systems (e.g. satellites, terrestrial transmitters, receivers); RF front end module(s) with circuitry components (e.g. mixers, filters, amplifiers, digital-to-analog and analog-to-digital converters as is known in the art or otherwise disclosed herein); processing module(s) for signal processing of received signals to determine position information (e.g. times of arrival or travel time of received signals, atmospheric information from transmitters, and/or location or other information associated with each transmitter), for using the position information to compute an estimated position of the receiver, for performing methods described herein, and/or for performing other processing; memory module(s) for providing storage and retrieval of data and/or instructions relating to methods of operation described herein that may be executed by the processing module(s) or other module(s); sensor module(s) for measuring environmental conditions at or near the receiver (e.g. pressure, temperature, humidity, wind), which may be compared to the same environmental conditions at or near transmitters to determine the altitude of the receiver; other sensor module(s) for measuring other conditions (e.g. acceleration, velocity, orientation, light, sound); interface module(s) for exchanging information with other systems via other links other than a radio link; and/or input/output module(s) for permitting a user to interact with the receiver. Processing by the receiver can also occur at a server.

It is noted that the term "positioning system" may refer to satellite systems (e.g. Global Navigation Satellite Systems (GNSS) like GPS, GLONASS, Galileo, and Compass/Beidou), terrestrial systems, and hybrid satellite/terrestrial systems.

Certain aspects disclosed herein relate to positioning modules that estimate the positions of receivers—e.g. where the position is represented in terms of: latitude, longitude, and/or altitude coordinates; x, y, and/or z coordinates; angular coordinates; or other representations. Positioning modules use various techniques to estimate the position of a receiver, including trilateration, which is the process of using geometry to estimate the position of a receiver using distances traveled by different "positioning" (or "ranging") signals that are received by the receiver from different beacons (e.g. terrestrial transmitters and/or satellites). If position information like the transmission time and reception time of a positioning signal from a beacon are known, then the difference between those times multiplied by speed of light would provide an estimate of the distance traveled by that positioning signal from that beacon to the receiver. Different estimated distances corresponding to different positioning signals from different beacons can be used along with position information like the locations of those beacons to estimate the position of the receiver. Positioning systems and methods that estimate a position of a receiver (in terms of latitude, longitude and/or altitude) based on positioning signals from beacons (e.g. transmitters, and/or satellites) and/or atmospheric measurements are described in co-assigned U.S. Pat. No. 8,130,141, issued Mar. 6, 2012, and U.S. Patent Application Publication No. US 2012/0182180, published Jul. 19, 2012.

RELATED APPLICATIONS

This application relates to the following related application(s): U.S. Pat. Appl. No. 62/237,317, filed 5 Oct. 2015, entitled SYSTEMS AND METHODS FOR GENERATING SIGNALS FROM TERRESTRIAL TRANSMITTERS, AND FOR PROCESSING THE SIGNALS USING GNSS RECEIVER HARDWARE. The content of the related application is hereby incorporated by reference herein in its entirety.

The invention claimed is:

1. A method for generating and transmitting positioning signals from terrestrial transmitters of non-Global Navigation Satellite System (GNSS) positioning systems for use by GNSS receiver hardware, the method comprising:
   identifying a chipping rate, wherein the identified chipping rate is equal to or is a multiple of a GNSS chipping rate;
   identifying a pseudorandom noise (PN) code length, wherein the identified PN code length is equal to or is a multiple of a GNSS PN code length;
   generating a PN code, wherein the generated PN code has a length equal to the identified PN code length, and wherein generating the PN code comprises:
   (a) generating a first PN code, wherein the first PN code, in a first region centered at zero lag, has an autocorrelation side-lobe magnitude that is less than a first threshold magnitude;
   (b) generating a second PN code, wherein the second PN code, in a second region centered at zero lag, has an autocorrelation side-lobe magnitude that is less than the first threshold magnitude,
   (c) wherein one or both of the first PN code or the second PN code are Gold codes; and
   (d) interleaving the first PN code and the second PN code to generate the PN code by (i) offsetting the second PN code relative to the first PN code using one of 1) a delay module or 2) an initial fill value of a PN code generator, and (ii) combining the first PN code and the offset second PN code,
   (e) wherein the PN code, in a third region centered at zero lag, has an autocorrelation side-lobe magnitude that is less than a second threshold magnitude,
   (f) wherein the width of the third region is greater than a threshold width, and
   (g) wherein the width of the third region is less than a sum of (i) the width of the first region and (ii) the width of the second region;
   identifying a transmission bandwidth that exceeds an integer multiple of a chipping bandwidth of the identified chipping rate;
   generating a transmit pulse shape having a bandwidth that is equal to the transmission bandwidth;
   using the identified chipping rate, the generated transmit pulse shape and the generated PN code to generate a positioning signal at a non-GNSS terrestrial transmitter; and
   transmitting the positioning signal from the terrestrial transmitter.

2. The method of claim 1, wherein the chipping bandwidth of the identified chipping rate is less than half of the transmission bandwidth.

3. The method of claim 1, wherein the transmission bandwidth is not an integer multiple of the chipping rate.

4. The method of claim 1, wherein the identified PN code length produces, at the identified chipping rate, a PN code duration that is equal to or is a multiple of a PN code duration used in a GNSS system.

5. The method of claim 1, wherein the identified chipping rate is equal to the chipping rate used in a GNSS system.

6. The method of claim 1, wherein the identified PN code length is equal to the PN code length used in a GNSS system.

7. The method of claim 1, wherein the identified chipping rate is a multiple of the chipping rate used in the GNSS system.

8. The method of claim 1, wherein the identified PN code length is a multiple of the PN code length used in the GNSS system.

9. The method of claim 1, the method comprising:
generating a third PN code using a third set of PN code generation parameters; and
generating a fourth PN code using a fourth set of PN code generation parameters,
wherein the PN code is generated by interleaving the first PN code, the second PN code, the third PN code, and the fourth PN code.

10. The method of claim 1, the method comprising:
receiving the positioning signal at a receiver;
generating, using GNSS receiver hardware, first positioning information using the positioning signal,
wherein the first positioning information includes a pseudorange; and
estimating the position of the receiver using the first positioning information.

11. A system having a non-GNSS transmitter operable to transmit a positioning signal used by a GNSS receiver to estimate a position of the GNSS receiver, wherein the system is operable to perform a method for generating and transmitting positioning signals from terrestrial transmitters of non-Global Navigation Satellite System (GNSS) positioning systems for use by GNSS receiver hardware, the method comprising:
identifying a chipping rate, wherein the identified chipping rate is equal to or is a multiple of a GNSS chipping rate;
identifying a pseudorandom noise (PN) code length, wherein the identified PN code length is equal to or is a multiple of a GNSS PN code length;
generating a PN code, wherein the generated PN code has a length equal to the identified PN code length, and wherein generating the PN code comprises:
(a) generating a first PN code, wherein the first PN code, in a first region centered at zero lag, has an autocorrelation side-lobe magnitude that is less than a first threshold magnitude;
(b) generating a second PN code, wherein the second PN code, in a second region centered at zero lag, has an autocorrelation side-lobe magnitude that is less than the first threshold magnitude,
(c) wherein one or both of the first PN code or the second PN code are Gold codes; and
(d) interleaving the first PN code and the second PN code to generate the PN code by (i) offsetting the second PN code relative to the first PN code using one of 1) a delay module or 2) an initial fill value of a PN code generator, and (ii) combining the first PN code and the offset second PN code,
(e) wherein the PN code, in a third region centered at zero lag, has an autocorrelation side-lobe magnitude that is less than a second threshold magnitude,
(f) wherein the width of the third region is greater than a threshold width, and
(g) wherein the width of the third region is less than a sum of (i) the width of the first region and (ii) the width of the second region;
identifying a transmission bandwidth that exceeds an integer multiple of a chipping bandwidth of the identified chipping rate;
generating a transmit pulse shape having a bandwidth that is equal to the transmission bandwidth;
using the identified chipping rate, the generated transmit pulse shape and the generated PN code to generate a positioning signal at a non-GNSS terrestrial transmitter; and
transmitting the positioning signal from the terrestrial transmitter.

12. One or more non-transitory machine-readable media embodying program instructions that, when executed by one or more machines, cause the one or more machines to perform a method for generating and transmitting positioning signals from terrestrial transmitters of non-Global Navigation Satellite System (GNSS) positioning systems for use by GNSS receiver hardware, the method comprising:
identifying a chipping rate, wherein the identified chipping rate is equal to or is a multiple of a GNSS chipping rate;
identifying a pseudorandom noise (PN) code length, wherein the identified PN code length is equal to or is a multiple of a GNSS PN code length;
generating a PN code, wherein the generated PN code has a length equal to the identified PN code length, and wherein generating the PN code comprises:
(a) generating a first PN code, wherein the first PN code, in a first region centered at zero lag, has an autocorrelation side-lobe magnitude that is less than a first threshold magnitude;
(b) generating a second PN code, wherein the second PN code, in a second region centered at zero lag, has an autocorrelation side-lobe magnitude that is less than the first threshold magnitude,
(c) wherein one or both of the first PN code or the second PN code are Gold codes; and
(d) interleaving the first PN code and the second PN code to generate the PN code by (i) offsetting the second PN code relative to the first PN code using one of 1) a delay module or 2) an initial fill value of a PN code generator, and (ii) combining the first PN code and the offset second PN code,
(e) wherein the PN code, in a third region centered at zero lag, has an autocorrelation side-lobe magnitude that is less than a second threshold magnitude,
(f) wherein the width of the third region is greater than a threshold width, and
(g) wherein the width of the third region is less than a sum of (i) the width of the first region and (ii) the width of the second region;
identifying a transmission bandwidth that exceeds an integer multiple of a chipping bandwidth of the identified chipping rate;
generating a transmit pulse shape having a bandwidth that is equal to the transmission bandwidth;
using the identified chipping rate, the generated transmit pulse shape and the generated PN code to generate a positioning signal at a non-GNSS terrestrial transmitter; and
transmitting the positioning signal from the terrestrial transmitter.

13. The one or more non-transitory machine-readable media of claim 12, wherein the chipping bandwidth of the identified chipping rate is less than half of the transmission bandwidth.

14. The one or more non-transitory machine-readable media of claim 12, wherein the transmission bandwidth is not an integer multiple of the chipping rate.

15. The one or more non-transitory machine-readable media of claim 12, wherein the identified PN code length produces, at the identified chipping rate, a PN code duration that is equal to or is a multiple of a PN code duration used in a GNSS system.

16. The one or more non-transitory machine-readable media of claim 12, wherein the identified chipping rate is equal to the chipping rate used in a GNSS system.

17. The one or more non-transitory machine-readable media of claim 12, wherein the identified PN code length is equal to the PN code length used in a GNSS system.

18. The one or more non-transitory machine-readable media of claim 12, wherein the identified chipping rate is a multiple of the chipping rate used in the GNSS system.

19. The one or more non-transitory machine-readable media of claim 12, wherein the identified PN code length is a multiple of the PN code length used in the GNSS system.

20. The one or more non-transitory machine-readable media of claim 12, the method comprising:

receiving the positioning signal at a receiver;

generating, using GNSS receiver hardware, first positioning information using the positioning signal, wherein the first positioning information includes a pseudorange; and estimating the position of the receiver using the first positioning information.

\* \* \* \* \*